United States Patent
Mankame et al.

(10) Patent No.: US 9,035,579 B2
(45) Date of Patent: May 19, 2015

(54) ACTUATION SYSTEMS COMPRISING AN ACTIVE-MATERIAL ACTUATOR

(75) Inventors: Nilesh D. Mankame, Ann Arbor, MI (US); James Holbrook Brown, Temecula, CA (US); Aragorn Zolno, Whittier, CA (US); James M Lombardi, Grosse Pointe Woods, MI (US); Crescenzio Pelino, Clinton Township, Macomb County, MI (US); Daniel Blair, Rancho Santa Margarita, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 229 days.

(21) Appl. No.: 13/618,340

(22) Filed: Sep. 14, 2012

(65) Prior Publication Data

US 2013/0061523 A1    Mar. 14, 2013

Related U.S. Application Data

(60) Provisional application No. 61/534,659, filed on Sep. 14, 2011, provisional application No. 61/548,956, filed on Oct. 19, 2011.

(51) Int. Cl.
*H02P 1/00* (2006.01)
*B60J 7/02* (2006.01)

(52) U.S. Cl.
CPC ............ *B60J 7/022* (2013.01); *Y10T 74/18792* (2015.01); *E05Y 2201/404* (2013.01); *E05Y 2900/542* (2013.01); *E05Y 2201/214* (2013.01); *E05Y 2201/246* (2013.01); *E05Y 2201/43* (2013.01); *E05Y 2201/434* (2013.01); *E05Y 2201/696* (2013.01); *E05Y 2400/554* (2013.01); *E05Y 2400/58* (2013.01); *E05Y 2800/67* (2013.01); *E05F 15/41* (2015.01)

(58) Field of Classification Search
CPC ......................... E05Y 2800/67; E05Y 2400/58
USPC .................. 318/280, 282, 286, 445, 466, 468
See application file for complete search history.

(56) References Cited

U.S. PATENT DOCUMENTS

| | | | | |
|---|---|---|---|---|
| 4,039,222 A * | 8/1977 | Wolf et al. | ..................... | 296/222 |
| 4,220,900 A * | 9/1980 | Mintz | ............................ | 318/266 |
| 4,629,953 A * | 12/1986 | Inoue et al. | ................... | 318/468 |
| 4,914,367 A * | 4/1990 | Niewiadomski et al. | ..... | 318/663 |
| 5,026,113 A * | 6/1991 | DiCarlo et al. | ............... | 296/221 |
| 5,069,502 A * | 12/1991 | Sekine et al. | ................. | 296/223 |
| 5,558,388 A * | 9/1996 | Furst et al. | ................. | 296/107.2 |
| 6,428,092 B1 * | 8/2002 | Friedmann et al. | ........... | 296/223 |

* cited by examiner

*Primary Examiner* — Rina Duda
(74) *Attorney, Agent, or Firm* — Mickki D. Murray; Parks Wood LLC

(57) ABSTRACT

An actuator system for use in selectively engaging an input to an output. The actuator system includes an input sub-system having an input component configured to connect to an input element which is in turn connected to a work source. The actuator system also includes an output sub-system being connectable to the input sub-system for receiving work from the work source via the input sub-system. The actuator system further includes an actuator sub-system having an active material and an actuating component. The actuator sub-system is configured so that the active material, when activated, causes the actuating component to move from a first state to a second state to disengage the input and output sub-systems.

20 Claims, 18 Drawing Sheets

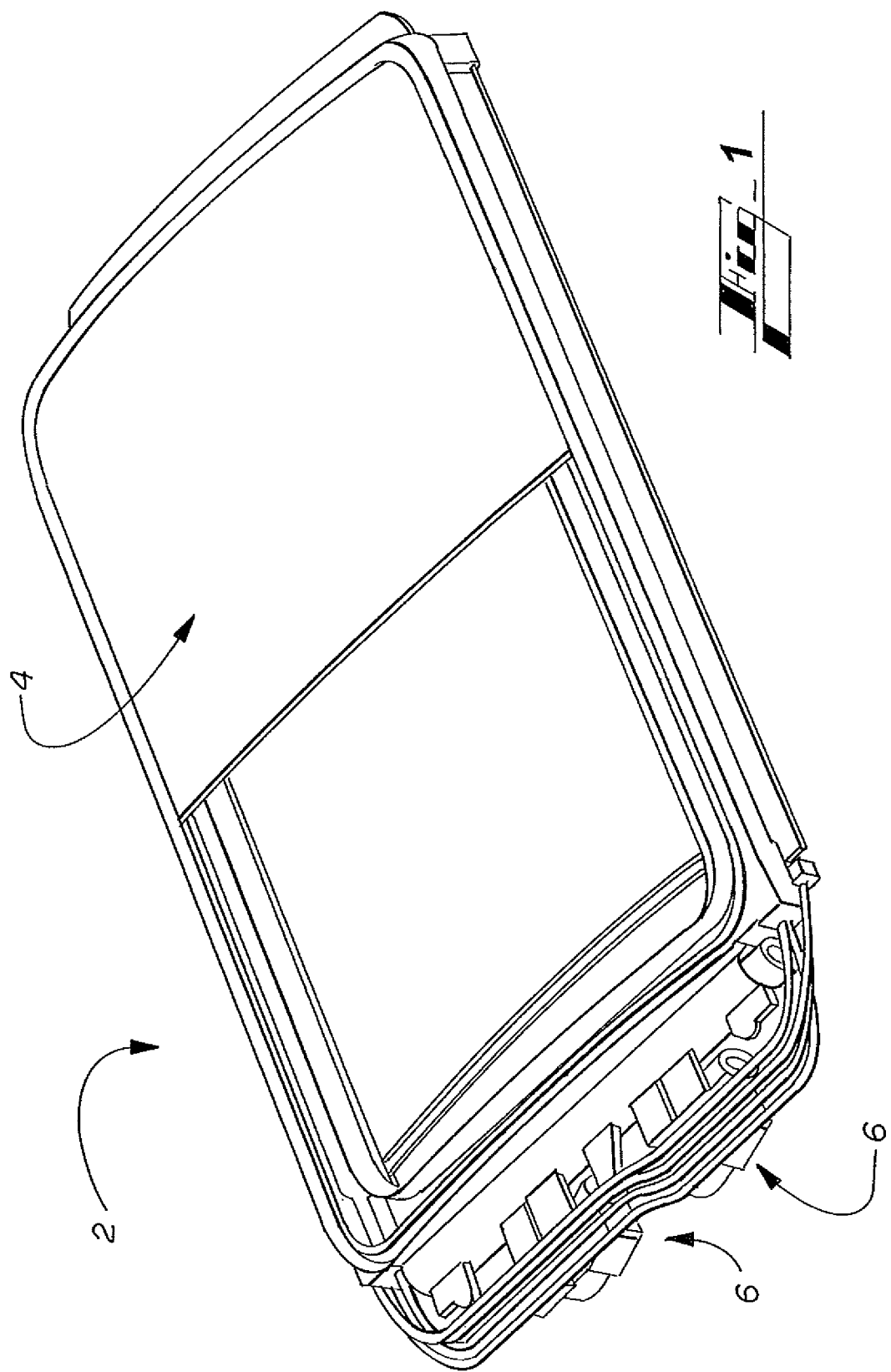

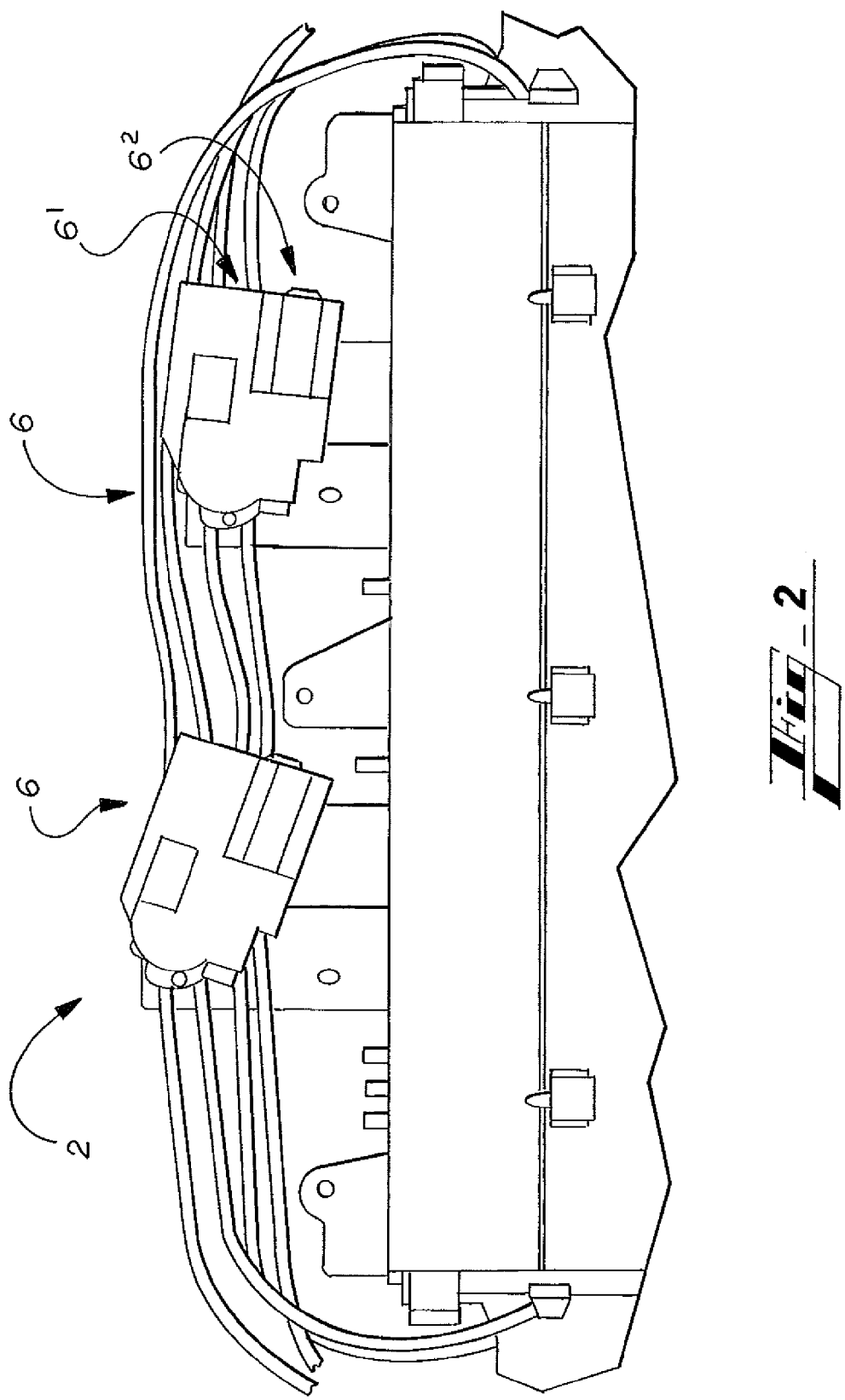

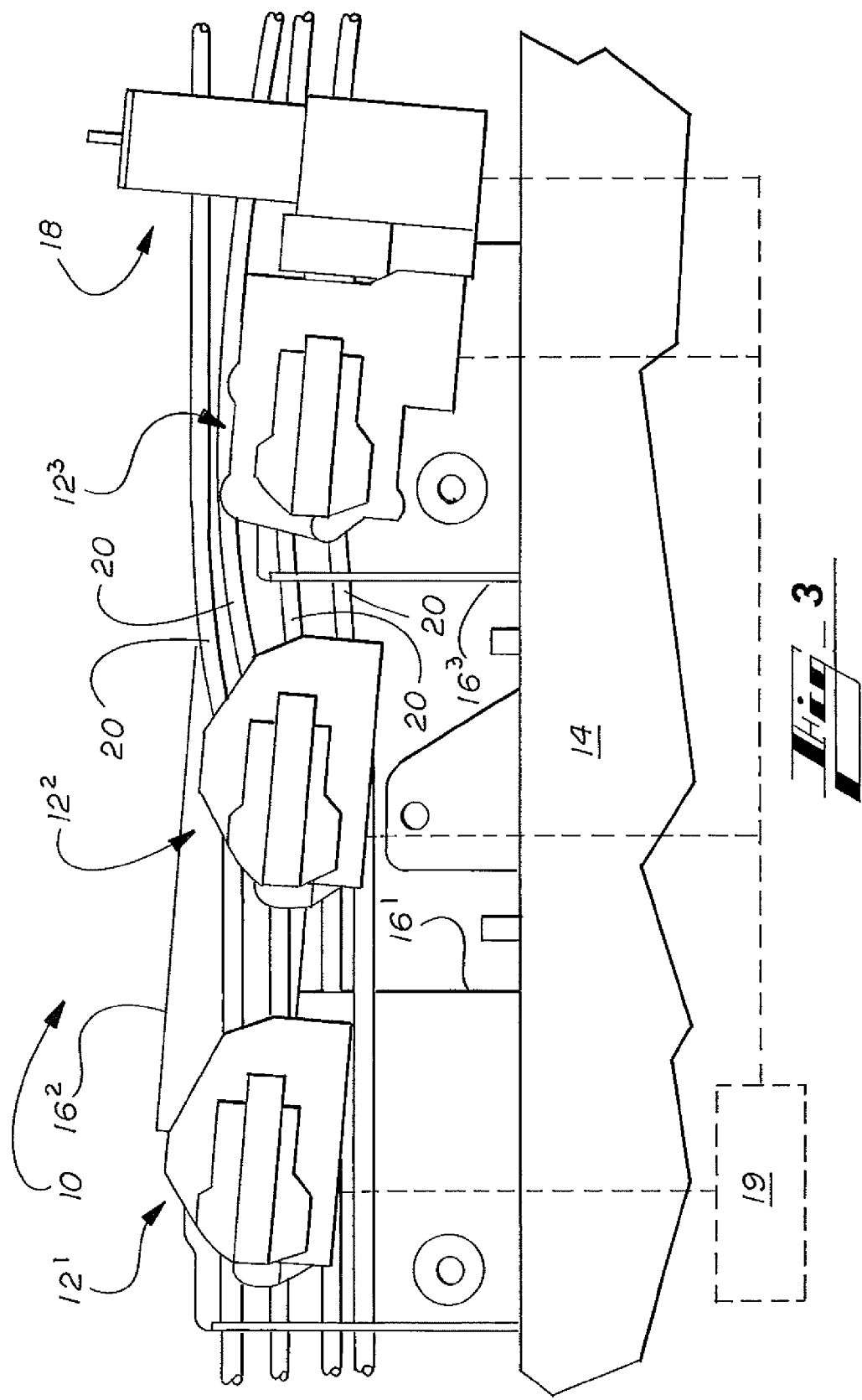

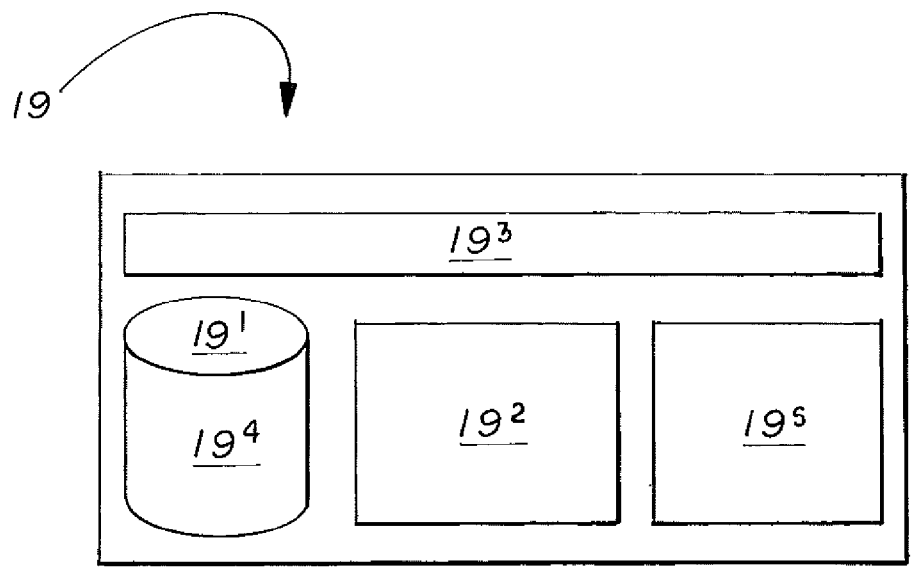
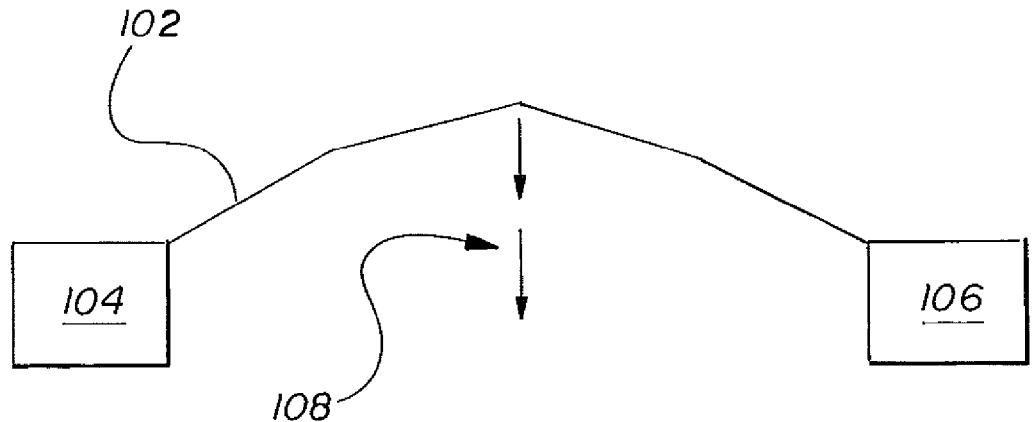

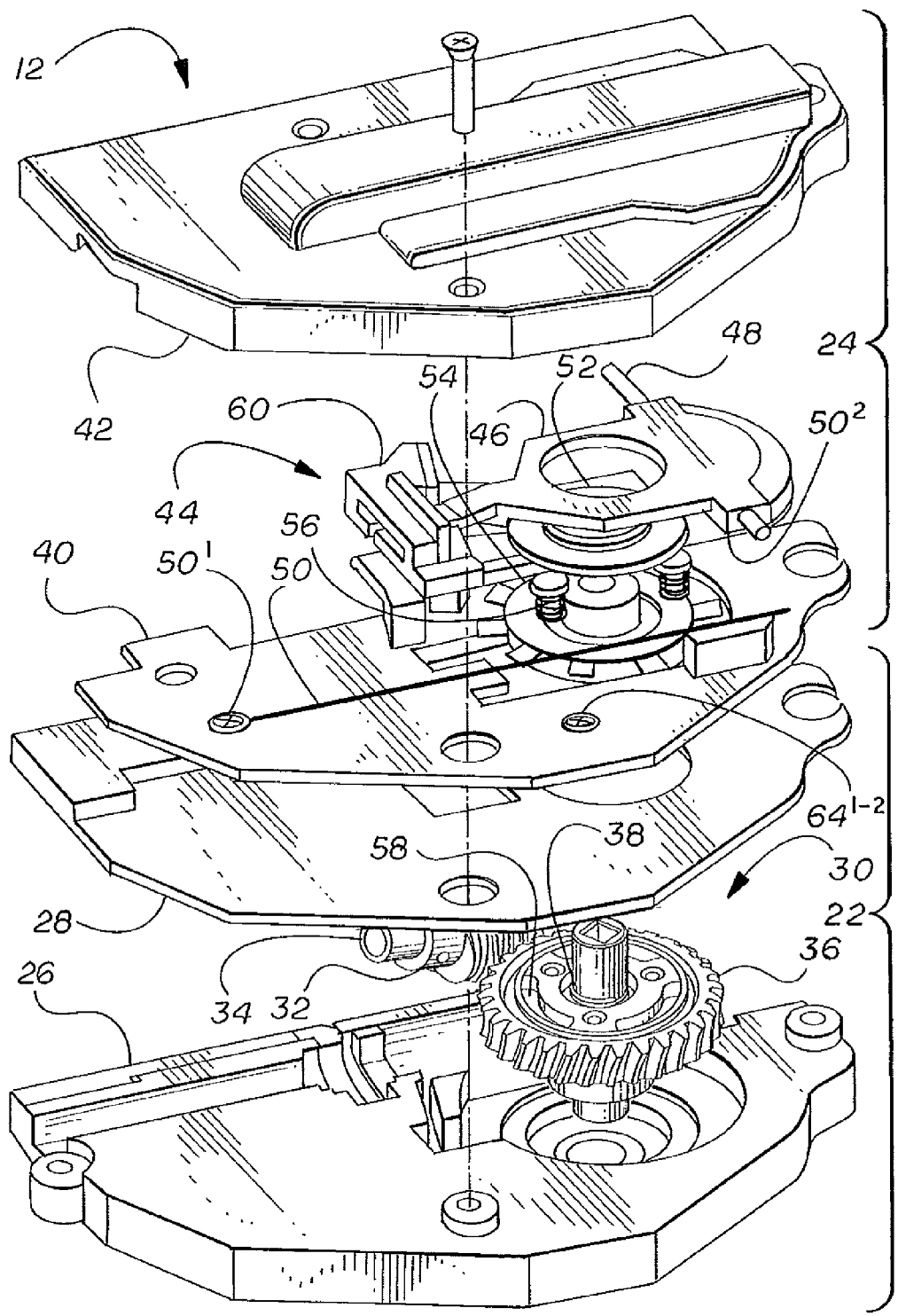

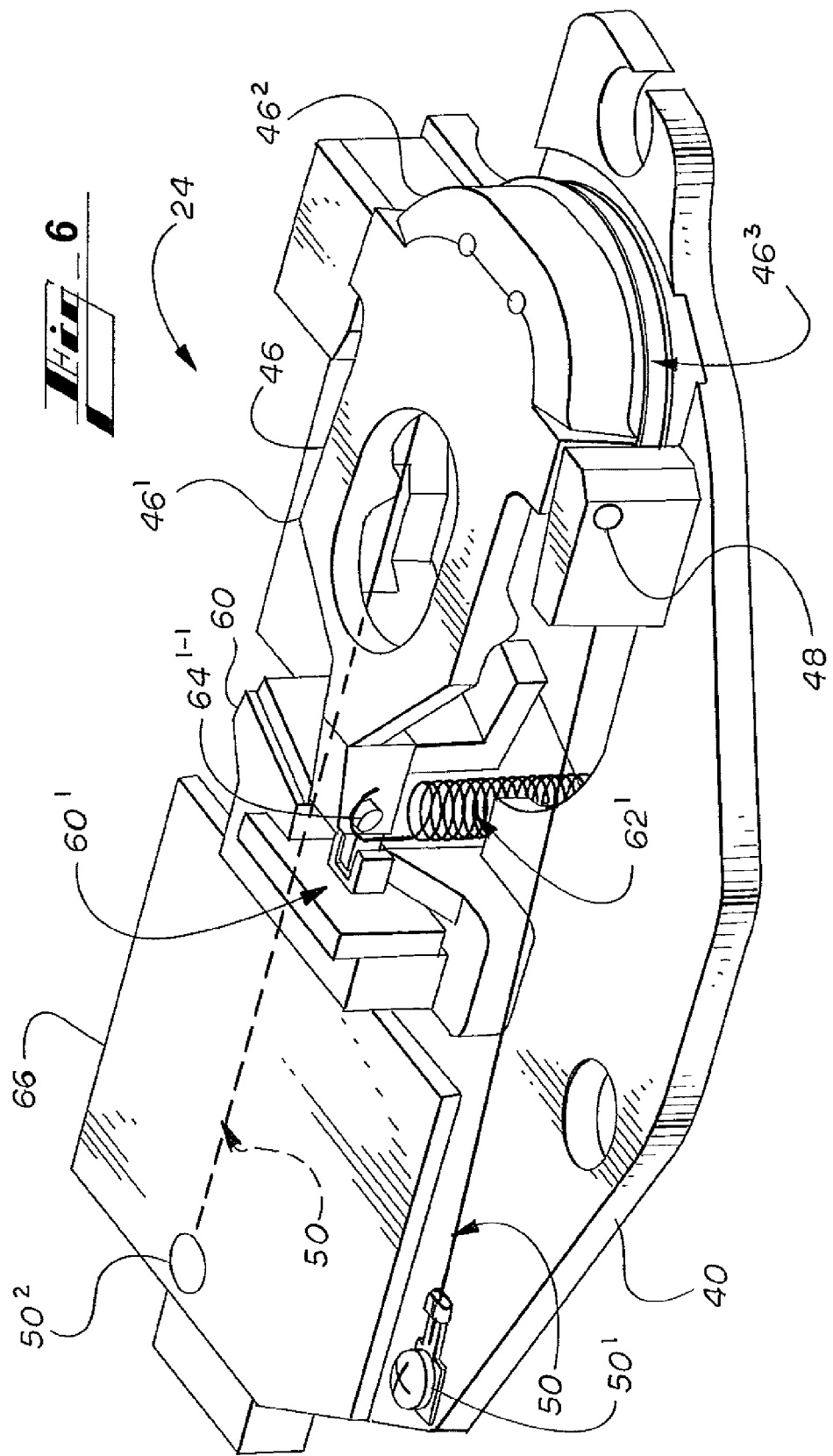

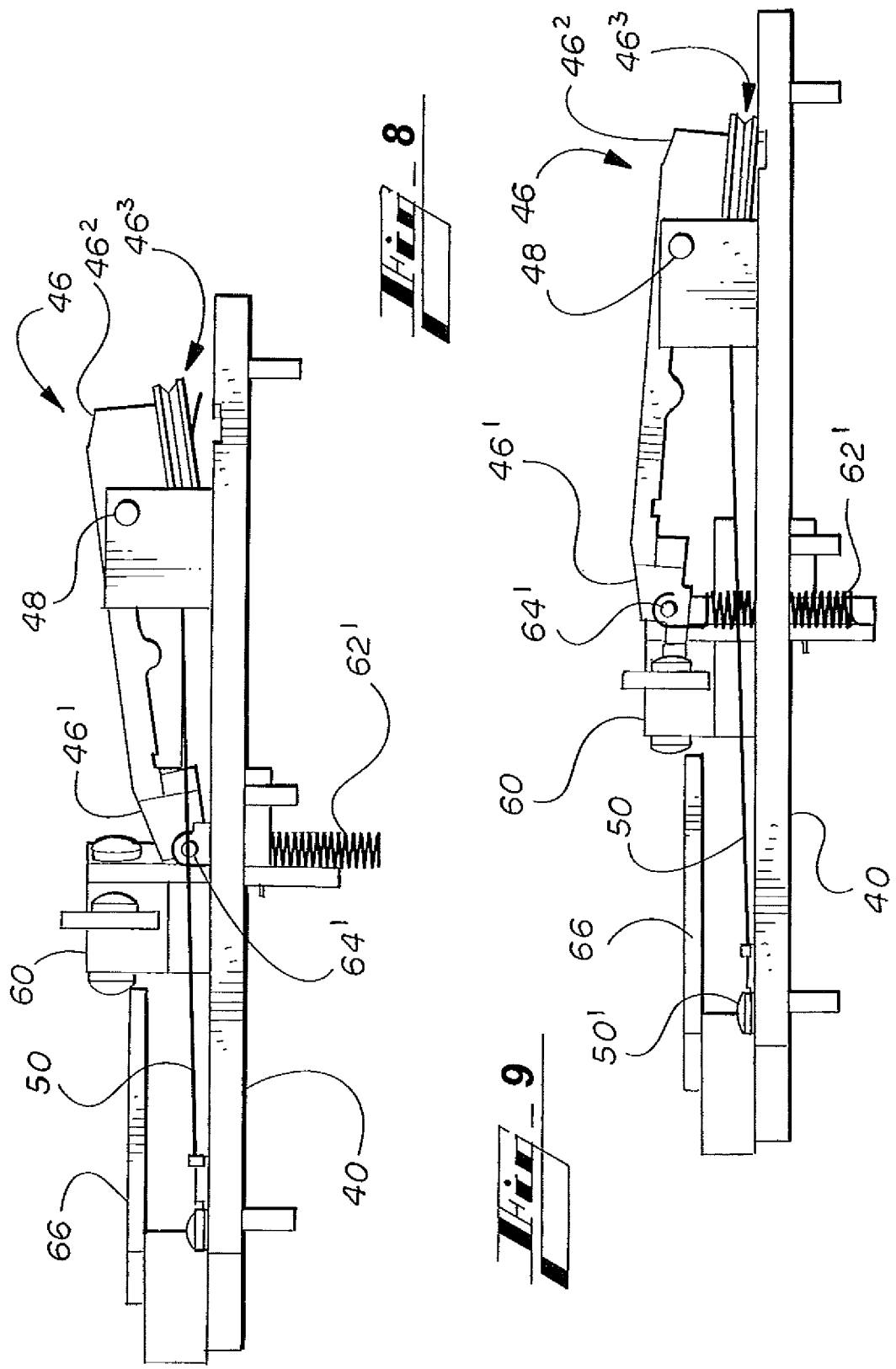

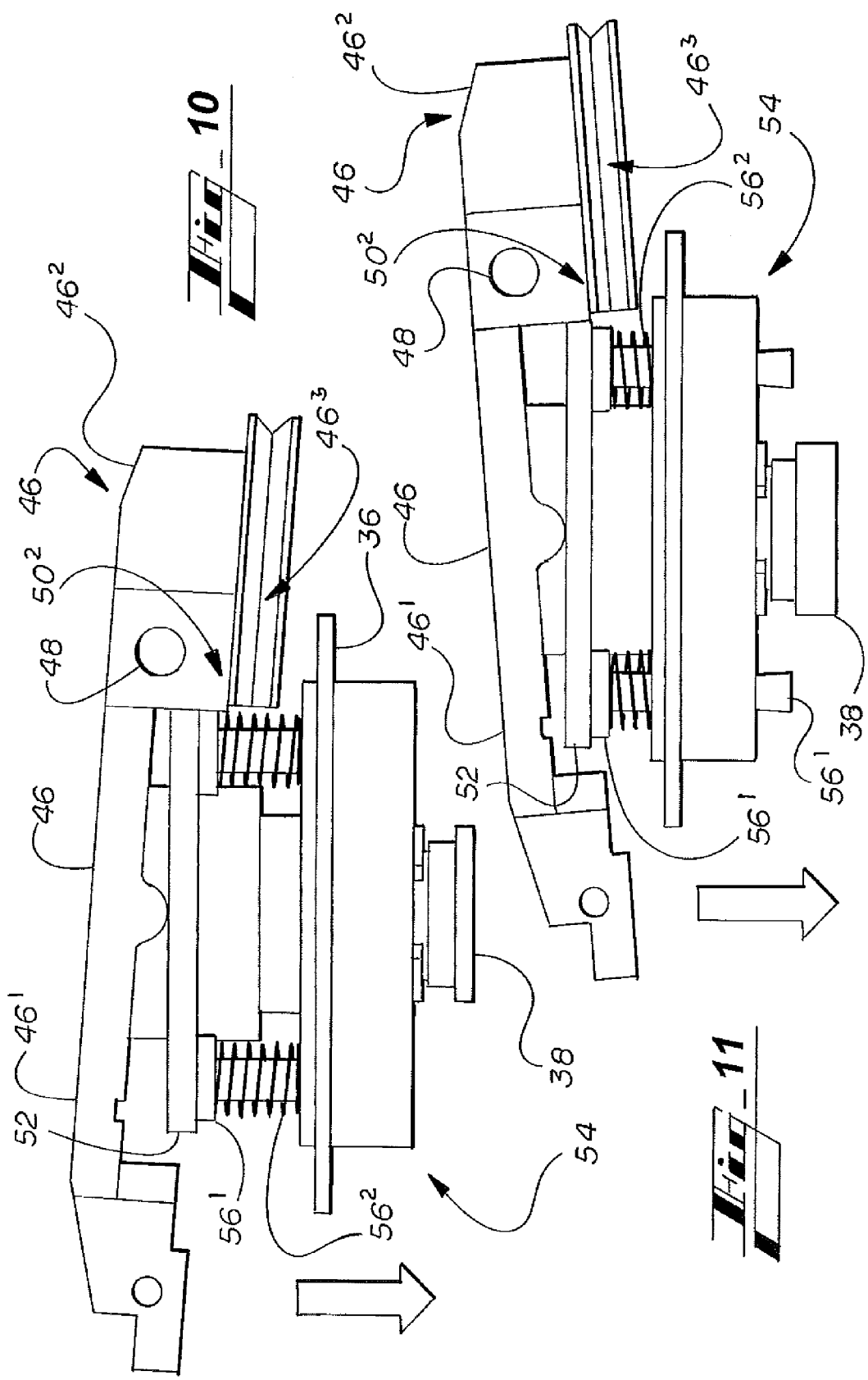

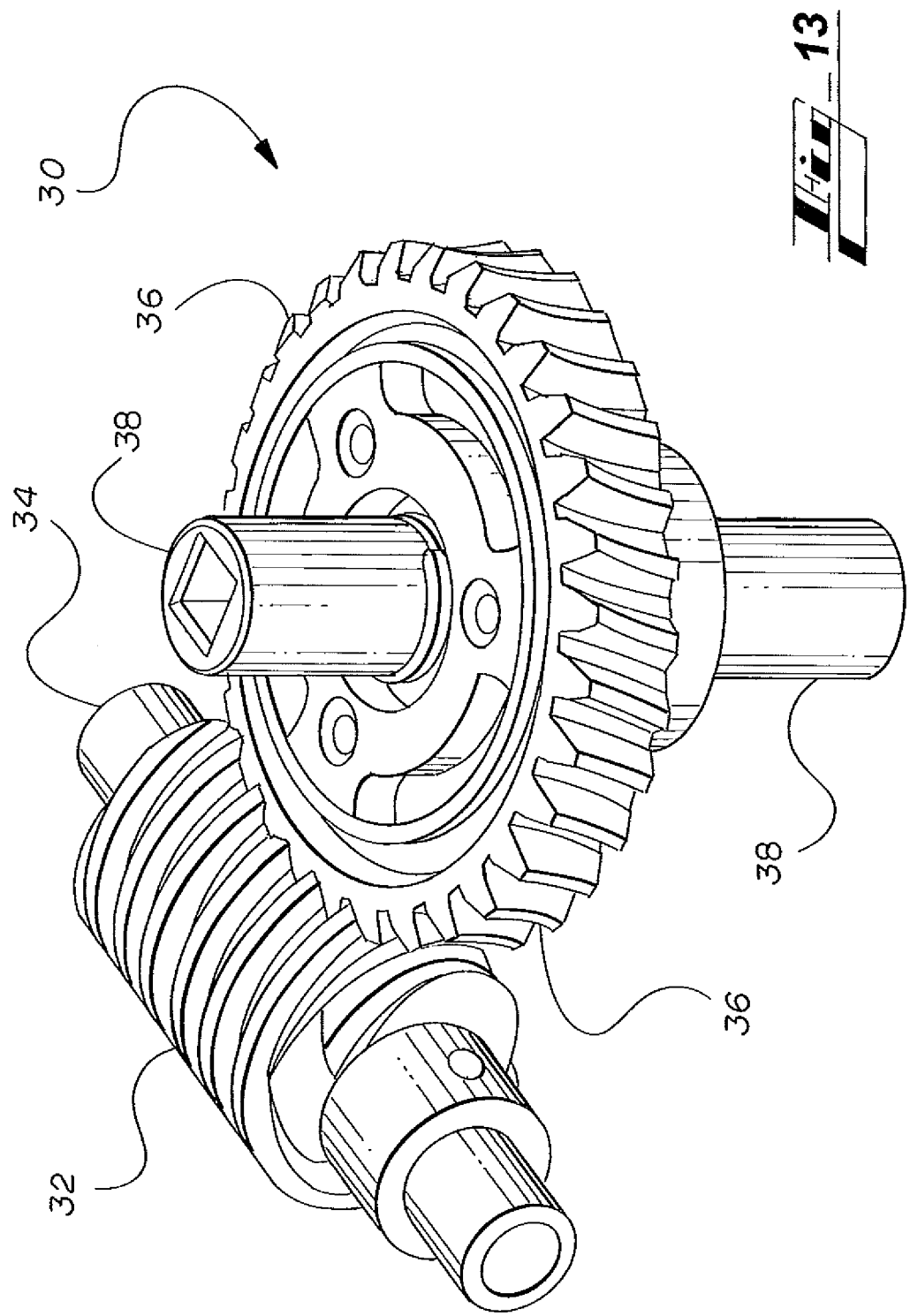

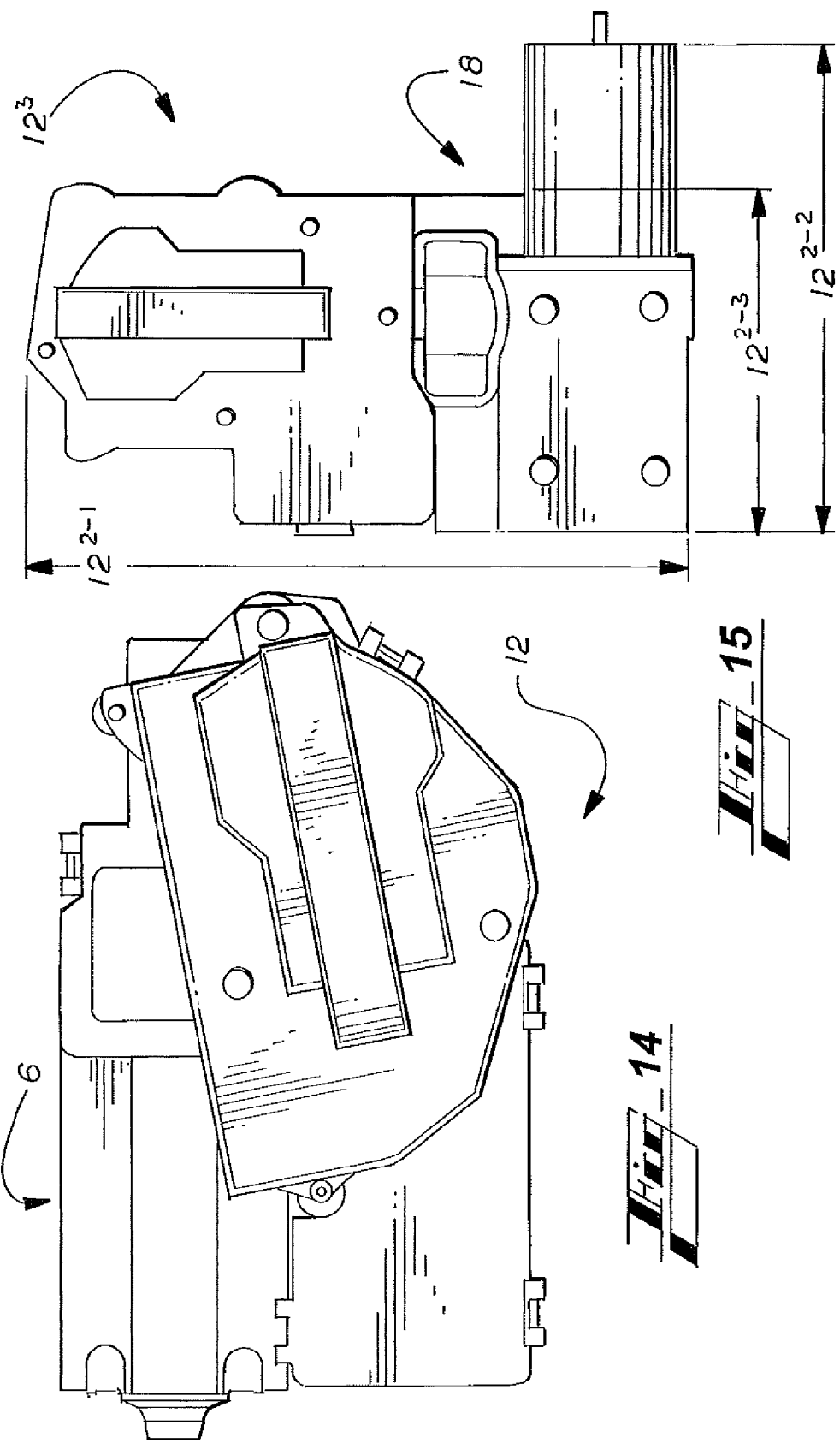

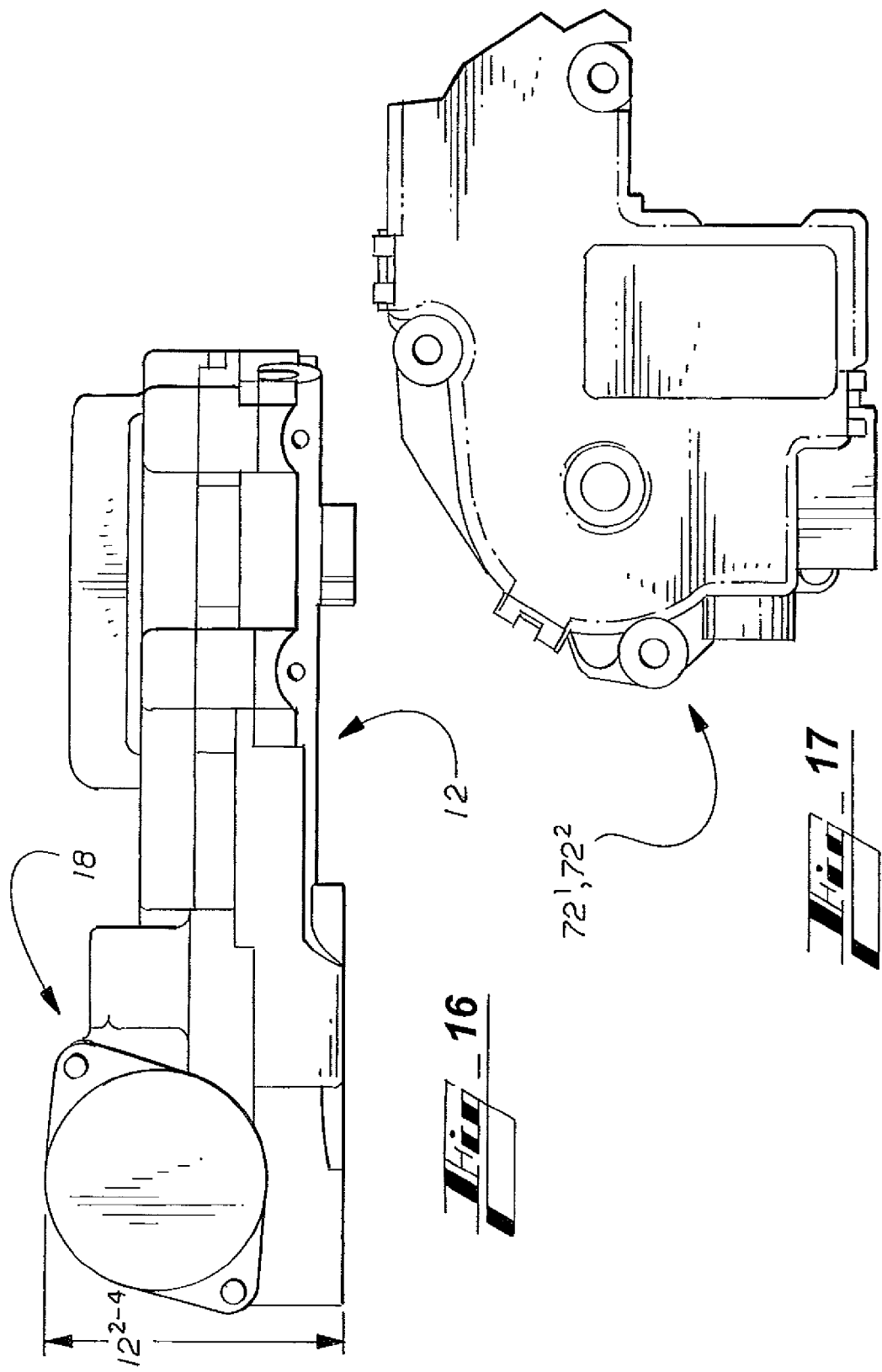

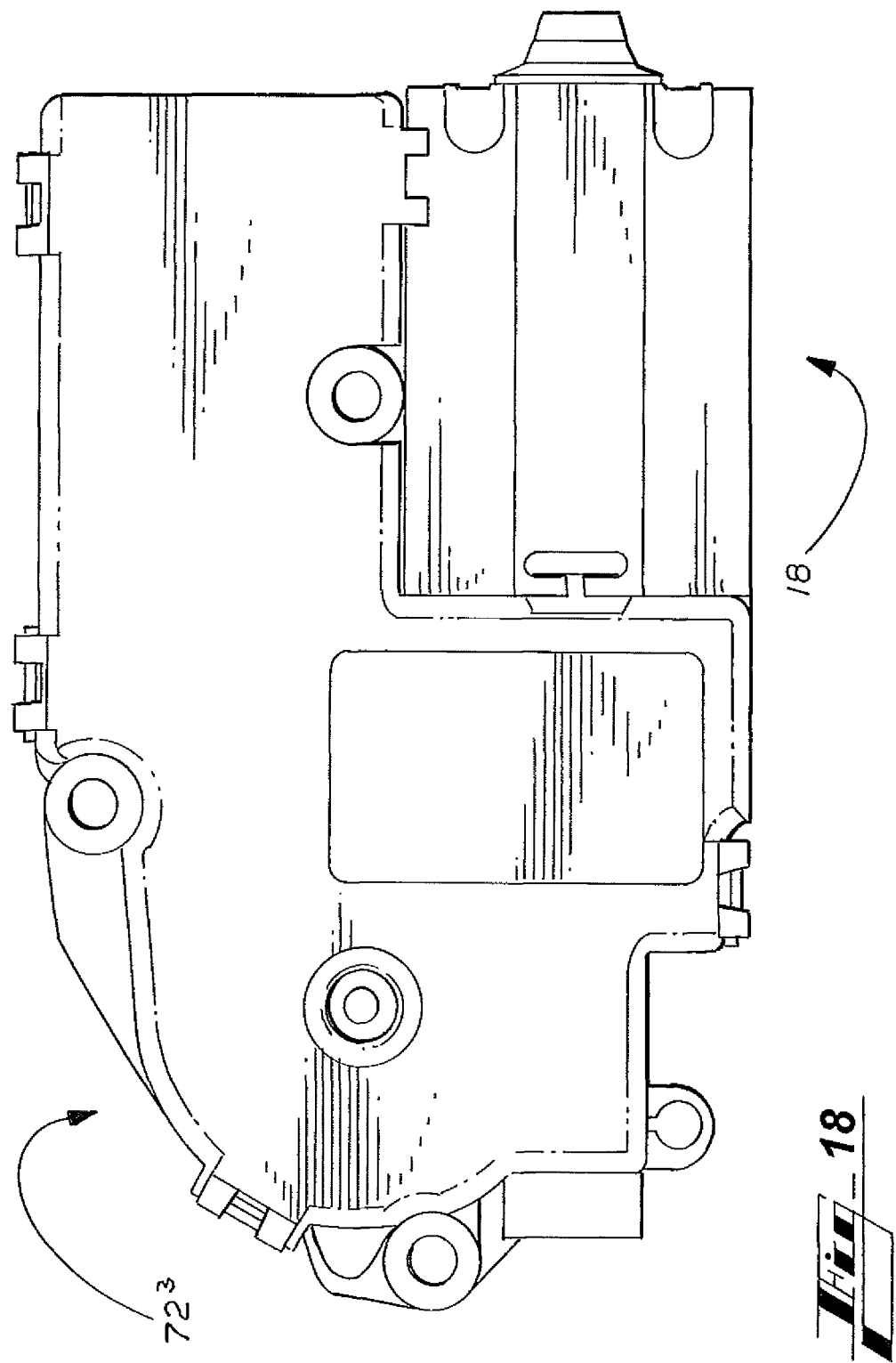

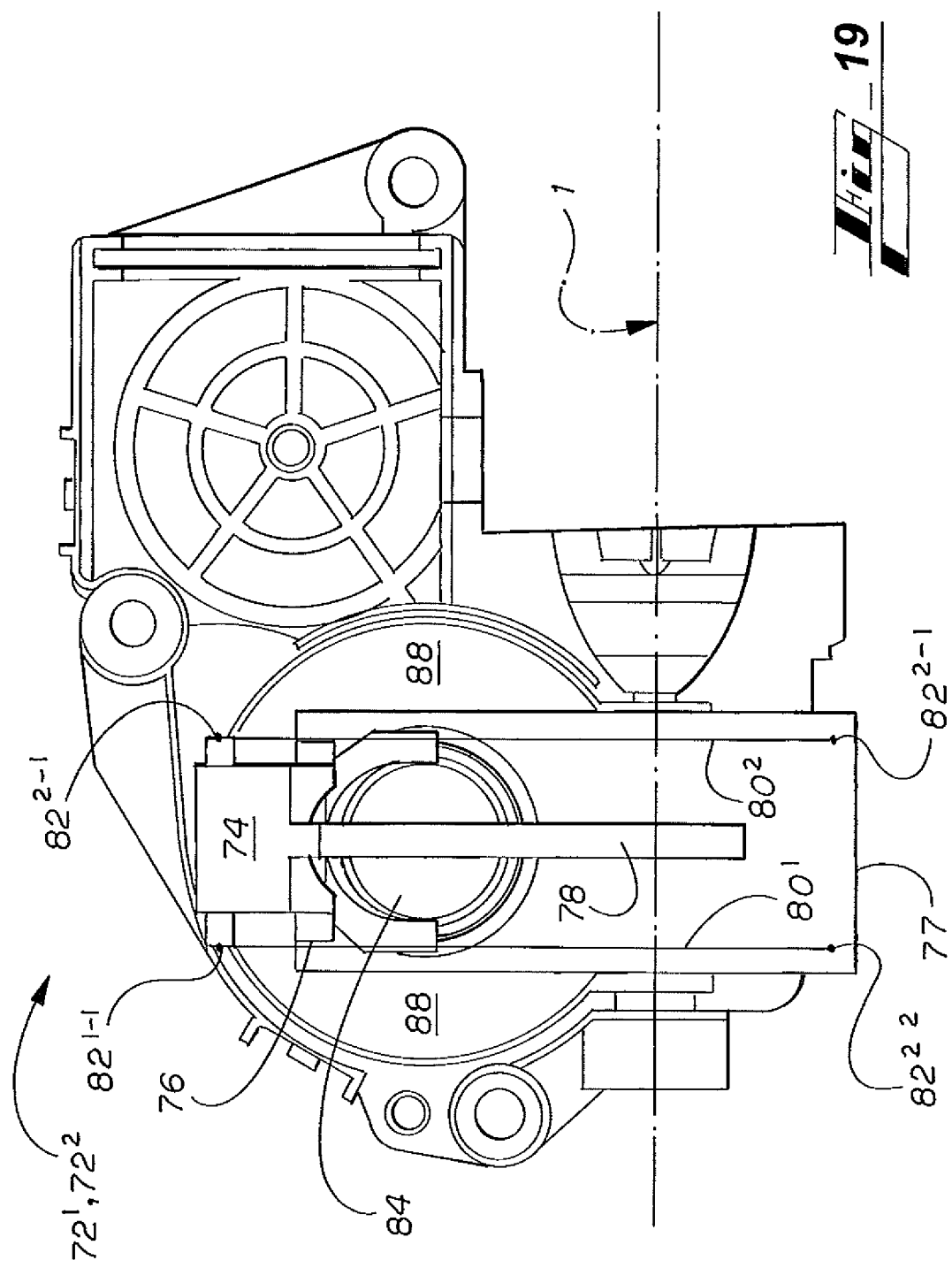

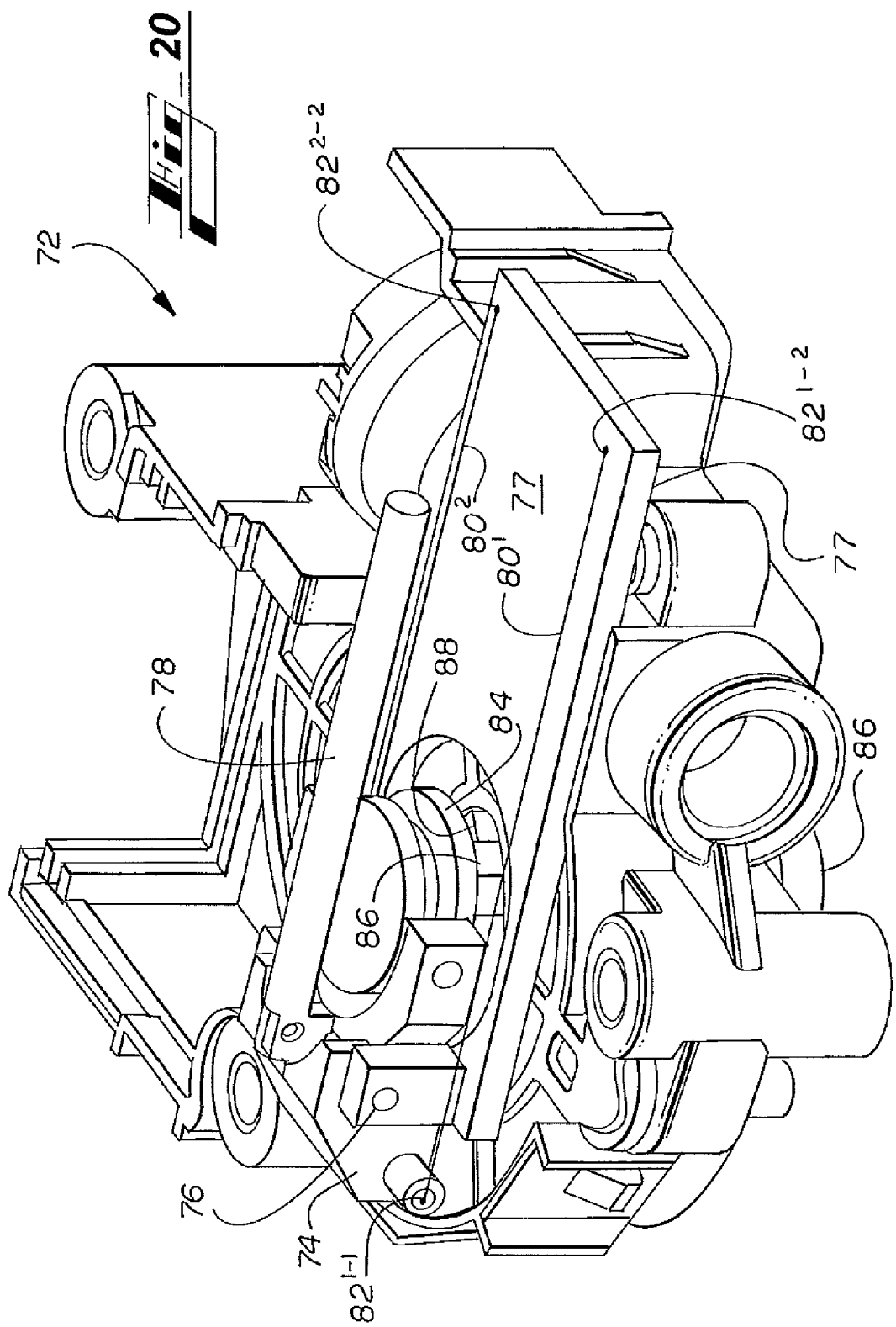

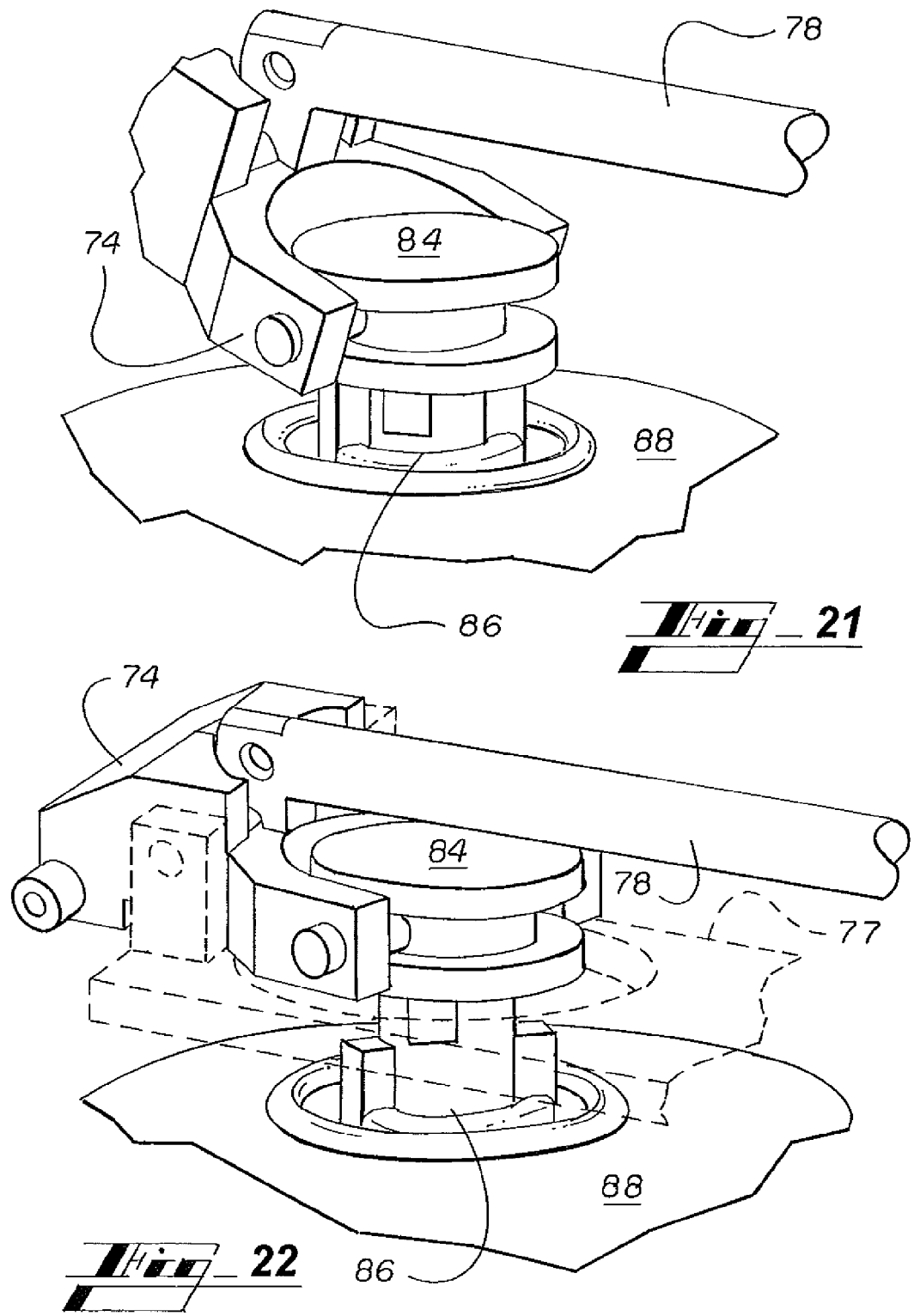

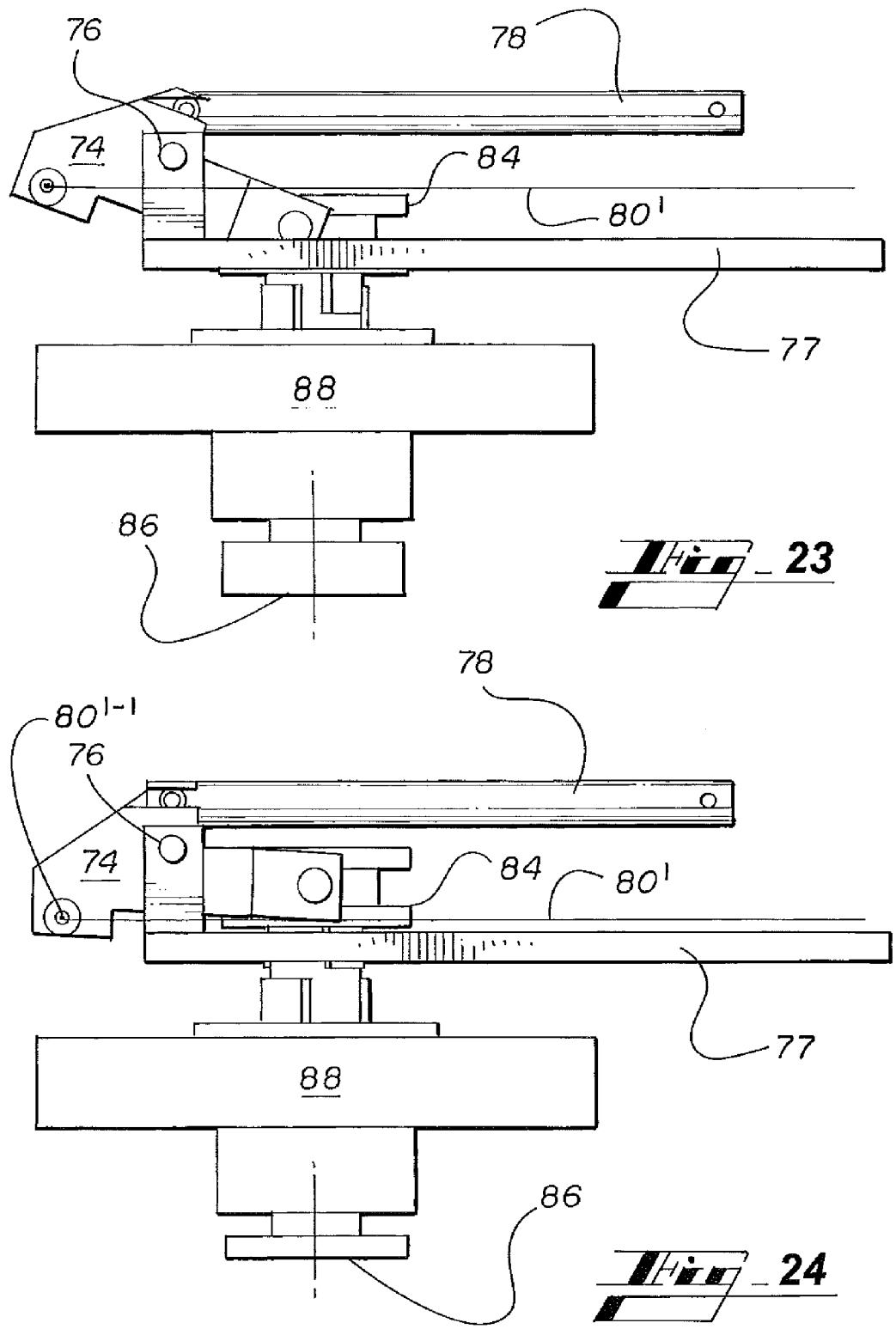

ACTUATION SYSTEMS COMPRISING AN ACTIVE-MATERIAL ACTUATOR

RELATED APPLICATIONS

This application has priority to U.S. Provisional Patent Application No. 61/534,659, filed Sep. 14, 2011, and U.S. Provisional Patent Application No. 61/548,956, filed Oct. 19, 2011, the entireties of which are incorporated herein by reference.

TECHNICAL FIELD

The present disclosure relates generally to hybrid drive assemblies including an active material and a power source, such as an electric motor, and to pinch protection processes, and, more particularly, to hybrid drive systems for use in an automobile sunroof system and pinch protection processes for use in connection with such systems.

BACKGROUND

Many systems such as vehicle sunroof systems have multiple moving parts visible to the user. In some cases, the parts have multiple states and positions. Sunroof systems can include a primary glass, a shade, and a vent. States include locked, or latched, and unlatched. Positions include opened, closed, and intermediate positions.

Traditional sunroof systems include multiple motors to control the multiple parts. The motors take up a relatively large amount of space with respect to the tight space requirements in the passenger compartment for which packaging space and headroom are so important. The motors also add an undesirable amount of mass to the sunroof system, and so to the vehicle. Multi-motor arrangements are also relatively costly.

These and other shortcomings of traditional sunroof systems are addressed by the technology described herein.

SUMMARY

The present disclosure relates to an assembly for selectively transferring work from an input component, such as a worm gear, to an output component, such as a drive gear or shaft, by selectively activating an active material. The active material is in some embodiments a shape memory alloy (SMA). When the active material is activated, it causes motion of an activating component, such as a lever to which it is connected. The moved activating component causing engagement between the input component and the output component.

In some embodiments, the assembly includes a locker hat and a locker intermediate the activating component (e.g., lever) and the output component (e.g., output shaft or gear). The locker is rigidly connected to the output component. The hat and locker are configured and positioned so that when the lever moves in a first direction, it pushes against the hat, which in turn pushes against the locker. The hat pushing against the locker causes the locker to engage the input component, thereby placing the input and output components into engagement, whereby movement of the input component is translated to movement of the output component.

The input component is connected for receiving power or work from a motor. The motor may be, for example, an electric motor. A particular type of electric motor is a permanent-magnet direct current (PMDC) motor.

In some embodiments, the system includes a plurality of such assemblies, each being connected to the same input component, or to respective input components. The one or multiple input components are connected for receiving power from a motor, such as described.

Assemblies according to the present technology having an actuator and gearing can be referred to as actuator/gearbox assemblies.

In a particular aspect, the present technology relates to an actuator system, for selectively engaging an input to an output. The system includes an input sub-system having an input component configured to connect to an input element which is in turn connected, for operation of the actuator system, to a work source. The system also includes an output sub-system being connectable to the input sub-system for receiving work from the work source via the input sub-system. The system further includes an actuator sub-system having an active material and an actuating component. The actuator sub-system is configured so that the active material, when activated, causes the actuating component to move from a first state to a second state. The actuator sub-system is configured so that the output sub-system is disengaged from the input sub-system when the actuating component is in the second state. The actuator sub-system is configured so that, when the actuating component is in the first state, the output sub-system is engaged to the input sub-system for receiving work from the work source via the input sub-system.

In another particular aspect, the present technology relates to a pinch-protection system, for use in avoiding an unwanted pinch condition. The pinch-protection system includes a processor and a computer-readable storage medium. The medium comprises a preset offset value and computer-executable instructions that, when executed by the processor, cause the processor to perform operations. The operations include monitoring a physical characteristic of power source beginning at a start of a time segment. The operations also include calculating, during the time segment, and based on results of the monitoring, a running average for the physical characteristic. The operations further include determining, during the time segment, whether a present value for the physical characteristic exceeds the running average by at least the preset offset value. The operations still further include determining, in response to determining that the amount of the current exceeds the running average by at least the preset offset value, that a pinch condition exists.

In still another particular aspect, the present technology relates to an actuator system, for selectively engaging an input to an output. The actuator system includes a first actuator device having a first input sub-system configured to connect to a work source, a first output sub-system, and a first actuating sub-system having a first default engaged position and a first active material that, when activated causes disengagement of the first input sub-system from the first output sub-system. The actuator system also includes a second actuator device having a second input sub-system configured to connect to the work source, a second output sub-system, and a second actuating sub-system having a second default engaged position and a second active material that, when activated causes disengagement of the second input sub-system from the second output sub-system.

While the present technology may be implemented in a wide variety of contexts, the technology is described herein primarily in connection with a sunroof system of an automobile. Another exemplary use is in connection with adjustable seats of an automobile.

Other aspects of the present technology will be in part apparent and in part pointed out hereinafter.

DESCRIPTION OF THE DRAWINGS

FIG. 1 illustrates a sunroof system including two motors.

FIG. 2 is a close-up of a portion of the system of FIG. 1.

FIG. 3 is the close-up of FIG. 2 with the two motors replaced by actuator/gearbox assemblies connected to a single work source, such as a motor, according to an embodiment of the present disclosure.

FIG. 4 illustrates an exemplary controller for monitoring and controlling operation of the actuator/gearbox assemblies, according to an embodiment of the present disclosure.

FIG. 5 is an exploded view of the actuator/gearbox assemblies of FIG. 3, according to an embodiment of the present disclosure.

FIG. 6 is a perspective of a first embodiment of an actuator sub-assembly of the actuator/gearbox assemblies, according to an embodiment of the present disclosure.

FIG. 8 is a side view of select components, of the first embodiment of the actuator sub-assembly of the actuator/gearbox assemblies, in a first state or position.

FIG. 9 is a side view of select components, of the first embodiment of the actuator sub-assembly of the actuator/gearbox assemblies, in a second state or position.

FIG. 10 is a side view of other select components, of the first embodiment of the actuator sub-assembly of the actuator/gearbox assemblies, in their second position.

FIG. 11 is a side view of other select components, of the first embodiment of the actuator sub-assembly of the actuator/gearbox assemblies, in their first position.

FIG. 13 is a perspective of the output shaft, the input gear, and a second, worm, input.

FIG. 14 shows a plan view of one of the first two actuator/gearbox assemblies of FIG. 2 superimposed over the motor assembly of FIG. 1.

FIG. 15 shows a plan view of a third of the actuator/gearbox assemblies of FIG. 3 superimposed over the motor assembly of FIG. 1 along with additional gearing parts of the motor.

FIG. 16 shows a side view of the third actuator/gearbox assembly and motor assembly and gearing shown in FIG. 15.

FIG. 17 is a plan view of a second embodiment of an actuator/gearbox assembly corresponding in ways, such as generally by size and some functions, to the first and second actuator/gearbox assemblies shown in FIG. 3.

FIG. 18 is a plan view of a second embodiment of an actuator/gearbox assembly corresponding in ways, such as generally by size and some functions, to the third actuator/gearbox assembly shown in FIG. 3.

FIG. 19 is a plan view of the actuator/gearbox assembly shown in FIG. 17, with an actuator lid thereof removed.

FIG. 20 is a plan view of the actuator/gearbox assembly shown in FIG. 18, with an actuator lid thereof removed.

FIGS. 21 and 22 are close-up perspectives of select components of the actuator/gearbox assemblies, of FIGS. 17-20, in first and second positions.

FIGS. 23 and 24 are side views of components of the actuator/gearbox assemblies, of FIGS. 17-20, in the first and second positions.

FIG. 25 shows a schematic view of an aspect of a drive mechanism according to an embodiment of the present technology.

DETAILED DESCRIPTION

Figure 7:
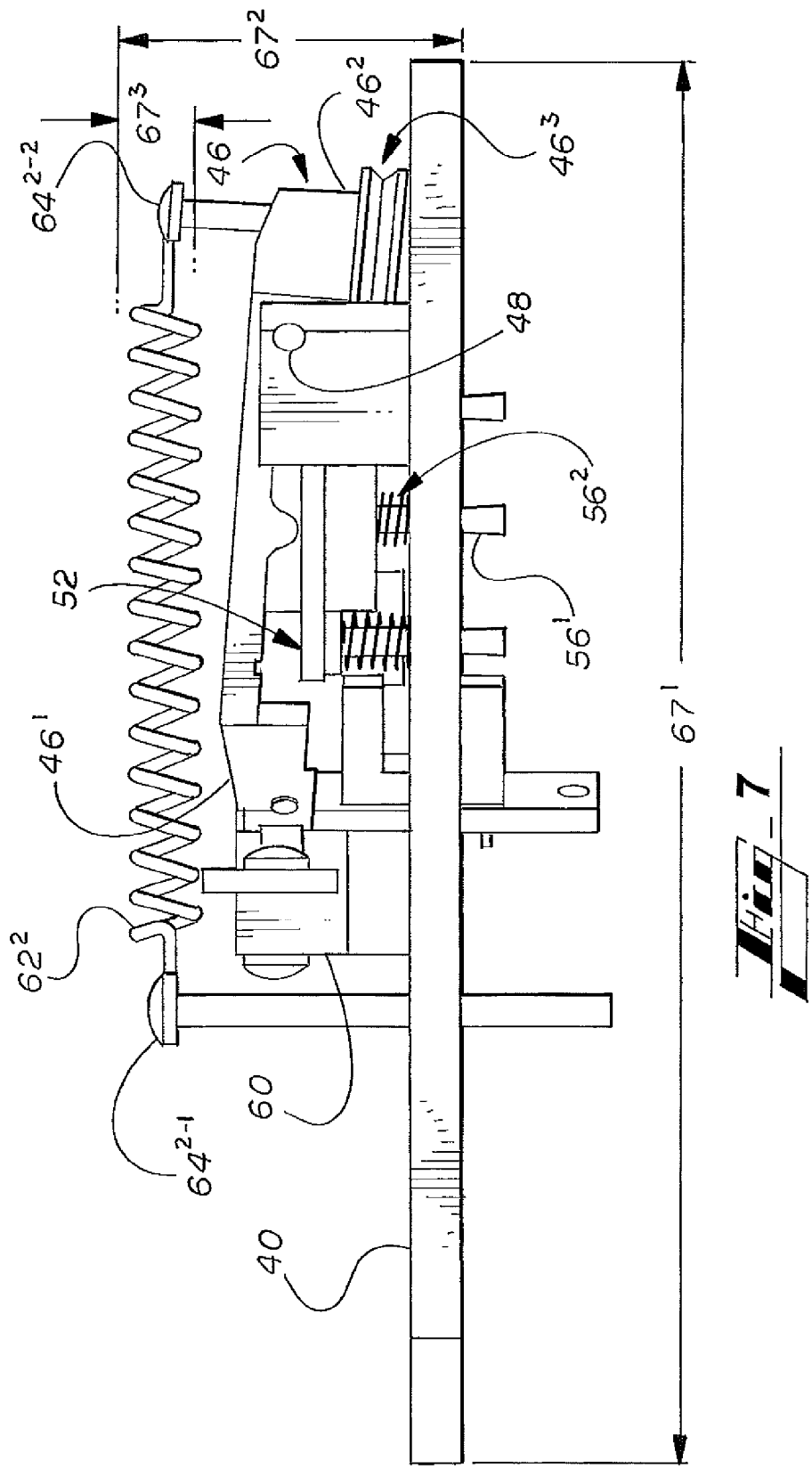
FIG. 7 is a side view of a second embodiment of the actuator sub-assembly of the actuator/gearbox assemblies, according to an embodiment of the present disclosure.

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to employ the present disclosure.

Introduction to the Detailed Description

In various embodiments, the present disclosure describes assemblies for selectively transferring work from an input component, such as a worm gear, to an output component, such as a drive gear or shaft, by selectively activating an active material. The active material may include, for instance, a shape memory alloy (SMA), such as FLEXINOL® (FLEXINOL is a registered trademark of Dynalloy, Inc., of Tustin, Calif.). The actuating assemblies can be used to translate work from a single work source, e.g., motor, to any number of multiple activities, each corresponding with one of the actuating assemblies, in place of traditional systems including a separate motor for each activity. As a result, for example, N motors+N gearboxes, for driving N power features, can be replaced with one work source (e.g., motor) and N actuator/gearboxes for driving the same N power features.

While the source of work is described primarily herein as a DC motor, the work source can have other forms. For example, it is contemplated that the work source can include a hydraulic pump, a pneumatic pump, or another type of motor. Accordingly, the work translation or transferring features described primarily herein (e.g., gearing, clutch) can instead include corresponding hydraulic components, pneumatic components, or components corresponding to whatever type of work is being received at the actuator assembly. For example, the translation features can include, instead of and/or in addition to gears, other types of couplings, such as belt or chain drives, linkages, hydraulic or pneumatic couplings, clutches, etc.

References herein to a certain exemplary embodiment, such as an implementation of a motor and gearing, is considered to also disclose broadly analogous implementations having the other configurations, such as those having the hydraulic components.

The actuator assembly is configured in some embodiments so that the input drive elements, connected to the motor, are normally, or by default, engaged. In some embodiment, the actuator assembly is configured so that the input drive elements are normally disengaged from output components (e.g., an output gear). These alternative embodiments can be referred to as normally-engaged and normally-disengaged embodiments. The actuator assembly is in its normal, default, state when the active material is not activated, or not actuated.

In one embodiment, in the normally-engaged design, moving system elements (e.g., a sunroof glass) are always mechanically connected to a drive motor through a non-reversing screw and worm drive or similar static or locking mechanism. The non-reversing nature of the drive ensures that only the motor can drive the moving elements; the moving elements cannot back drive the motor. Thus, the moving elements cannot be forced open mechanically, thereby guarding against unauthorized entry into the vehicle through the sunroof system.

As an example of operation in the normally-engaged embodiments, in response to a user pressing a sunroof glass open button, along with the source (e.g., motor 18 in FIG. 3) starting, actuator assemblies (e.g., the first and second assemblies 12$^1$, 12$^2$ in FIG. 3) associated with other functions of the sunroof (e.g., movement of a vent and a shade) are turned on, or actuated from their normally-engaged state to disengage, thereby keeping the vent and shade from being moved. The vent referred to could be associated with, for instance, a tilting function for the sunroof glass. On the other hand, an actuator assembly (e.g., the third assemblies 12$^1$ in FIG. 3) associated with a glass-movement function would be configured and arranged in the system so that it is left engaged upon actuation so that work, e.g., drive, from the source, e.g., motor, can be translated in the assembly to an output drive for moving the glass.

As another example in which the actuator assemblies 12 are each default engaged, if a user presses an all open button, relating to the sunroof glass, shade, and vent, then none of the assemblies actuate—i.e., they all remain in their default, engaged, state. The source, e.g., motor, turns on in response to the user pressing the buttons and, because all of the actuator assemblies are engaged, the work, e.g., drive, from the motor is translated through the actuator assembly to respective output components connected to the glass, shade, and vent for operating them as desired. Conversely, the user can press an all close button, resulting in generally the same scenario, except that the motor drive is in the opposite direction.

In some embodiments, a time delay is introduced between actuating the actuator assemblies and turning on the motor. For example, the system may be configured so that the motor turns on one or more of the actuator assemblies supposed to turn on are turned on (actuated) first.

In one embodiment, when the operator releases the button, all of the actuators turn on and the motor reverses for a short period of time (e.g., 100 ms) to release any pressure built up on clutch pins, making it easier for them to release.

Benefits of the normally-engaged embodiments include avoiding wear or other damage to the active material by having it normally (e.g., usually) non-activated. Another benefit is a reduction in parts count and complexity.

SMA actuator systems and other such actuator systems sometimes include a sub-system for protecting the actuator element from mechanical overload. A mechanical overload occurs when a force required of or exerted on the SMA exceeds a design limit of the SMA. Again, while SMA actuator systems are described herein, they are described by way of example and other types of actuator systems may be design and used according to the technologies herein.

In some embodiments, the actuator assemblies are designed to protect the active material from mechanical overload. In some particular embodiments, this is accomplished using springs and/or levers, and in other particular embodiments this is accomplished without using additional springs and levers.

The most common occurrence of mechanical overloads is associated with a load being moved by the SMA actuator getting jammed or the load otherwise having its motion impeded. The overload spring provides a parallel path for safely expending the force developed by the SMA actuator. This spring and the sub-system supporting it have a minor effect on system performance under normal operation, but can plays a key role in protecting the SMA actuator during mechanical overloads.

As an example of overload addressed in one embodiment of the resent technology, reference is made to FIGS. 10 and 11. The figures show the bell crank lever 46 pushing on the locker 52 during normal operation. The bell crank lever 46 is mechanically coupled (including at a contact interface) to the locker 52 and, through the locker, to a downstream load through compressive contact. As the contact interface has no adhesive properties, the contact coupling can transfer only compressive forces. In other words, the mechanical coupling between the crank lever 46 and locker 52 exists only as long as they are in compressive contact.

During normal operation, the bias spring (reference numeral 62$^1$ in FIG. 9) ensures a compressive contact, and hence a mechanical force transmission path, between the lever 46 and the locker 52. Even when the load jams or otherwise ceases to move in response to the movement of the SMA-actuated lever 46, the lever can still move under the influence of the SMA actuator exactly as it does during normal operation. The difference is that, in the case of the output being jammed, the rest of system does not operate properly, however the SMA actuator is protected from mechanical overload. Thus, the bias spring (reference numeral 62$^1$, FIG. 9), which is in one embodiment designed to keep the drive normally engaged, also serves as the mechanical overload protection system. This eliminates the need for a separate mechanical overload protection system.

Another contemplated overload scenario is the load being forced when it is supposed to be still, or forced in an opposite direction than it is supposed to be moving.

More general benefits of the present technology include, and are not limited to, savings in cost, space, and energy use. Exemplary cost savings include those occasioned by obviating cost of a lot of wiring, drive components, and electronics of the redundant motor of the previous systems.

Space savings are occasioned because the size of the actuator assemblies of the present technology can be much less than that of the previous multiple-motor systems. For instance, in some case a single actuator assembly can have a height that is up to or greater than 30% shorter. Energy savings result at least from the reduction in number of motors used to drive the system as compared to the conventional system described above.

Other benefits include meeting and in many cases exceeding current goals for mass, noise levels, performance levels (e.g., power or torque needed), and response time, between user request for the activity and performing the activity. For instance, in some embodiments, the assembly includes a high-torque clutch. Operation of the high-torque clutch has been found to be sufficiently quiet or better, and in many embodiments substantially silent. Although a clutch of the actuator assembly can be configured to handle and require other levels of torque, in some embodiments, the clutch has been found to handle torques of at least 5 Nm while requiring less than 0.11 Nm to actuate.

Benefits also include an ability to package multiple actuator assemblies and one motor where multiple motors where previously needed. Similarly, the present technology allows positioning of a single motor and a plurality of actuator assemblies, corresponding to a plurality of respective functions, in a space in which a corresponding plurality of motors, which would be required according to traditional systems for a corresponding plurality of activities, would not fit. Thus, more functions can be performed in the same component footprint taken up by prior systems and certain functions can be performed in a footprint smaller than prior systems required to perform the same certain functions.

A motor can be custom designed to match characteristics (e.g., speed-torque) of the system in which it is being used according to the present technology. This will permit, for instance, avoidance or reduction of the extra gear stage and mechanical transmission losses (e.g., friction) associated with the extra stage, thereby increasing the mechanical efficiency of the entire drive.

Other benefits of the present technology include a flexibility to perform consistently in a wide temperature range. For example, embodiments of the technology employ one or more of (i) a high-temperature, or ultra-high-temperature, active material, for use in high-ambient-temperature operating environments, (ii) hardware (e.g., circuitry) and/or software (logic) configured to control an input trigger signal (e.g., electrical current) provided to the active material based on an ambient temperature in the environment of the active material, and (iii) a hot cutoff to limit energy provided to the active material, making it more reliable in a broad range of temperatures.

The hot cut-off system in some embodiments comprises a photo-interrupter connected to a bell crank lever (e.g., ref. numeral 46 in FIGS. 10 and 11). When the active material (e.g., SMA) element has actuated completely, the photo interrupter is triggered thereby cutting off power supply to the SMA. The SMA then cools and the bell crank droops until the photo interrupter is reset and power is restored to the SMA element. This causes the SMA to arrest and reverse the drooping of the bell crank. The system can be designed to exploit the hysteresis inherent in the material response of the SMA such that the power cycling described above does not hinder the primary operation of the system.

The stimulus for activating the SMA can come from any of a variety of courses. For example, the stimulus can be an electrical current directed to the SMA from the primary vehicle battery, alternator, or the like.

In one embodiment, the control circuit attempts to maintain a constant heating current {or other input} for the SMA element regardless of variations in the supply voltage. The constant heating current ensures a nearly consistent response from the system independent of supply voltage fluctuations if the ambient temperature remains constant. When the ambient temperature changes, the heating current needed to activate the SMA also changes—the required current goes down when the ambient temperature goes up and vice versa. The hot cut-off based power cycling described above ensures that the SMA element does not overheat by reducing the duty cycle of the heating current even though its DC value is largely independent of the ambient temperature.

Further regarding efficiency, the present technology has been found to meet and in many cases reduce or greatly reduce response, or lag, times between functions, such as between a user pressing an open-sunroof button, and the sunroof actually beginning to open.

Further regarding sound, careful choice of materials and design of the system can mitigate the noise levels. Noise levels can be decreased, for instance, by using certain select (e.g., production) materials for parts such as the gearbox and the motor, as compared to using other materials (e.g., rapid materials). Examples of modifications include using one polymer and one metal (e.g., brass) gear in a mating pair to produce a mismatch in the stiffnesses thereby increasing the acoustic impedance for propagation of noise.

Benefits of the present technology described herein are not exhaustive and are examples providing a better understanding of the configuration, function, and usefulness of the technology.

FIG. 1—Exemplary Sunroof Context

Now turning to the figures, and to the first figure more particularly, FIG. 1 illustrates an exemplary system 2 in which the technology of the present disclosure is implemented. The illustrated system 2 is a sunroof apparatus for an automobile including a sunroof 4. The sunroof 4 is movable by work of one or more motors 6 between an open position (shown in FIG. 1) and a closed position.

The sunroof apparatus is provided as only one example of a system 2 in which the technology of the present disclosure can be implemented. The technology can be used in any of a wide variety of environments involving selective actuation and, more particularly, actuation of a clutch for selective engagement to a power source. In some embodiments, the technology is used in contexts involving a drive mechanism, such as a motor or other power source, and multiple places, or activities, at which the power is needed for performing work selectively.

Another example implementation is with adjustable car seats. Each of the actuator/gearbox assemblies described below could be, for instance, associated with one or more respective adjustable portions of a seat, such as a fore-aft positioning assembly, an incline/decline positioning assembly, a height assembly, and a lumbar assembly.

FIG. 2—Detail of Exemplary Sunroof Context

FIG. 2 shows a close-up view of a portion of the exemplary system 2 of FIG. 1. As shown, each of the motors 6 includes a gearbox part $6^1$ and a primary motor part $6^2$.

FIGS. 3 and 4—Introduction of Actuator/Gearbox Assemblies

FIG. 3 shows a view like that of FIG. 2 of a system 10 having at least one actuator/gearbox assembly 12. While the system 10 may include one or more actuator/gearbox assemblies 12, FIG. 3 shows three actuator/gearbox assemblies $12^1$, $12^2$, $12^3$ by way of example. The actuator/gearbox assemblies $12^1$, $12^2$, $12^3$ are connected to a frame component 14 directly or by way of mounts $16^1$, $16^2$, $16^3$. As provided below in further detail, each actuator/gearbox assembly 12 is operatively connected to a motor 18.

The motor 18 provides a driving power for use in moving parts of the system 10, such as the sunroof 4 shown in FIG. 1, or a vent, wind deflector, or shade (not shown in detail) of the sunroof assembly. The actuator/gearbox assemblies 12 are controlled to selectively connect the driving power of the motor to parts of the system for moving those parts. The result may be, for instance, latching or unlatching a vent, wind deflector, or shade of the sunroof system 10, or moving the vent, wind deflector, shade, or glass 4 toward an open or closed position. Similarly, in a context of an adjustable seat, the result may be adjusting a fore-aft positioning assembly, an incline/decline positioning assembly, a height assembly, and/or a lumbar assembly of the seat.

In the illustrated example, a first two of the actuator/gearbox assemblies $12^1$, $12^2$ are spaced apart from and connected to the motor 18, while a third of the actuator/gearbox assemblies $12^3$ is more closely adjacent the motor 18. The third actuator/gearbox assembly $12^3$ may be connected directly to the motor 18.

FIG. 3 also shows schematically that the system 10 can include at least one controller 19. The controller(s) 19 can include a computer processor or other controlling unit. The controller 19 may be partially or fully positioned local to the actuator assembly 12 or relatively remote to the assembly 12.

In some embodiments, the controller 19 includes the circuit card 66, shown in FIGS. 6, 8, and 9, and in some embodiments they are distinct. In particular embodiments in which they are distinct, the controller 19 and the circuit card 66 can be independent or connected and coordinating to perform one or more processes. While in some embodiments the controller 19 is a vehicle control unit (e.g., body control module), in other embodiments the system 10 is connected to such a vehicle control unit.

Any control or processing operation described herein (e.g., initiating provision of stimulus to the SMA to initiate activation thereof, starting, stopping, or reversing motor operation, etc.) can be performed by any one or more of various control devices including the controller 19 of FIG. 3, the circuit card 66, an integrated circuit (not shown in detail beyond the circuit card), and a vehicle control unit. Steps or operations described herein are in some embodiments outlined in at least one algorithm. The algorithm can be codified and stored, e.g., in the computer-readable storage medium described herein.

The controller 19 selectively causes actuation of the actuator/gearbox assemblies $12^1$, $12^2$, $12^3$. The controller 19 may also be used to monitor operation of the parts, such as a work source (e.g., motor) and features (e.g., actuator/gearbox assemblies), as described further below.

Although the controller 19 is shown schematically, and disconnected from the actuator/gearbox assemblies 12, the controller 19 is in communication with each of the actuator/gearbox assemblies 12. The controller 19 is in some embodiments also in communication with the motor 18 for monitoring and/or controlling operation of the motor 18.

The system 10 also includes conduits 20 connecting the actuator/gearbox assemblies 12 to the motor 18, the controller 19, and each other $12^1$, $12^2$, $12^3$. Each of the conduits 20 can have a housing, such as a tubular casing containing communication media. The communication media can include, for example, gears or flexible output cord or shaft (or power shaft) for communicating work in the form of drive (e.g., physical movement). In one embodiment, it is preferred that one of the conduits includes an input drive, or driving component, connected to the motor 18 for communicating that drive from the motor 18 to at least each of the actuator assemblies $12^1$, $12^2$ not connected directly to the motor 18.

Although the third actuator assembly $12^3$, in FIG. 2, is shown connected directly to the motor 18, it may be connected indirectly to the motor, by way of the conduit transmitting drive from the motor, like the first two assemblies $12^1$, $12^2$ shown in FIG. 2. As describe further, herein, the driving component (or power shaft) from the motor 18 connects to a respective input component, such as a worm, positioned in each of the actuator assemblies 12.

Other conduits 20 include lines connecting the actuator assemblies 12 to components of the system that the assemblies are controlling, such as those for providing to the controller (e.g., controller 19) the feedback referenced above and described further below. The conduits 20 can lead to features of the sunroof assembly 2, such as the sunroof glass, shade, wind deflector, and vent, as shown partially in FIG. 2.

It is contemplated that at least one of the conduits 20 includes electric or optical wires or cable for communicating signals or messages. In a contemplated embodiment, the controller communicates wirelessly with one or more of the actuator/gearbox assemblies 12. Wireless communication may be affected via short-range wireless technologies such as BLUETOOTH® (BLUETOOTH is a registered trademark of Bluetooth Sig, Inc., of Kirkland, Wash.).

The conduits 20 can include sunroof system components, such as screws that drive nuts on the moving parts, such as the sunroof glass or shade. The screws and drive nuts are a part of a drive, e.g., baseline sunroof drive.

FIG. 4 shows select example detail of the controller 19 shown in FIG. 3. As provided above, a control unit for controlling operations described herein can include one or more of various control devices. The characteristics described with respect to FIG. 4 can be characteristics of one or more control devices working separately and/or in combination to perform the operations. For instance, the code, or instructions, described below can be part of a sunroof-dedicated controller and/or a remote vehicle control unit. Similar examples apply for the memory, the processor, and so on.

The controller 19 includes a tangible, non-transitory, computer-readable storage medium $19^1$. The storage medium $19^1$, or memory, is communicatively connected to a tangible computer processing unit $19^1$, or processor. The memory $19^1$ and the processor $19^2$ communicate by way of a communication media $19^3$, such as a computing bus.

The memory $19^1$ stores computer-readable instructions $19^4$. The instructions $19^4$, which may be stored in one or more modules, are configured to be processed by the processor to perform various monitoring and control functions of the present technology. The modules can be identified based on, for example, the one or more functions performed by the module. For instance, a module causing the processor $19^2$ to effect actuation of an aspect of the system 10 can be referred to as an actuation, or actuating, module. And a module causing the processor $19^2$ to effect latching or unlatching of a component of the system 10 can be referred to as a latching, unlatching, or latching/unlatching module. These and other functions are described in more detail above and further below. As provided, any steps or operations described herein can be codified in at least one algorithm and stored in, e.g., the computer-readable storage medium described herein.

While components of the controller 19 are shown together, any of the components may be positioned adjacent to any one or more of the components or remote to the other component(s). For instance, while the memory $19^1$ is illustrated schematically as being adjacent the processor $19^2$ in FIG. 4, the memory may be in a portion of the sunroof system 10, or of the greater vehicle, remote from the processor. In one embodiment, at least two of the components of the controller 19 communicate with each other wirelessly. For example, each of these components (e.g., memory $19^1$ and processor $19^2$) could include a wireless transceiver for communicating with each other.

For communication between components of the controller 19 and/or for communications between the controller 19 and devices external to the controller, the controller includes a communication interface $19^5$. The interface can be wired-based and/or wireless-based, such as by including a wireless transceiver.

As provided above, the controller 19 is in some embodiments configured to monitor operation of components of the system 10. As an example, in one embodiment, the system 10 includes motor encoders (not shown in detail) to relay, to the controller 19, an indication, such as an electrical (e.g., signal) or mechanical input, of a position of the system 10, such as a position of a sunroof glass component, a shade component, etc. In this embodiment, the algorithm, stored, e.g., in the computer-executable instructions $19^4$, can be configured to use such position indication(s) to affect system 10 operation. This enhanced control can result in, e.g., better position control and pinch protection to avoid pinching an item between, e.g., the sunroof glass and frame. The controller computing the absolute position of any feature based on the data feedback from the encoder can also be accomplished by the processor using sensor multiplexing.

Further regarding how the controller uses information about the position of different features, the following is provided. The controller compares a present or current position of one or more features to the electronic/software-based limit positions (e.g., position data stored in the computer-readable storage medium) to enforce a soft stop. The electronic limit positions are placed some distance away from the corresponding mechanical stop positions (e.g., positions enforced by mechanical interference between one or more moving and fixed members) such that the total travel between the soft stops is less than that between the mechanical stops. Electronic stops eliminate noise and harshness associated with hitting mechanical stops at each end of the travel and thus improve component life as well as user experience.

Further regarding how the controller uses information about the position of different features, the controller can infer a direction and a speed of motion of various features using a time history of absolute positions for the features. Direction of motion is used to decide which of the multiple motions requested by a user can be driven simultaneously and which need to be performed sequentially. The speed of a feature is used within a control rule (e.g., a proportional-integral-derivative (PID) related rule or other control loop feedback mechanism) for controlling input to the motor in order to achieve a desired speed-time profile.

In some embodiments, features may need to move relative to each other in a certain manner. In one embodiment, relative motion of the glass and shade must occur in the following manner: the glass always needs to cover the shade. For example, when both glass and shade are opening, the shade is ahead of the glass. Conversely, when both glass and shade are closing, the glass is ahead of the shade. The controller has the relative-position information regarding these two features, or any other group of the features, as well as the direction of their motion at any given time for enforcing the control rule.

FIG. 5—Actuator/Gearbox Assemblies in More Detail

FIG. 5 shows an exploded view of an exemplary one of the actuator/gearbox assemblies 12 of FIG. 2. The actuator/gearbox assembly 12 can in one perspective be seen to include two primary assemblies, a gearbox sub-assembly 22 and an actuator sub-assembly 24.

The components of the actuator/gearbox assembly 12, though, can be grouped as desired for explanatory purposes. The gearbox sub-assembly, or aspects thereof, can also be referred to, for instance, as an input sub-assembly. Aspects of the actuator sub-assembly, such as the clutch can be part of what is referred to as an output sub-assembly.

Work and power from the motor 18 is introduced to the actuator/gearbox assembly 12 by way of the gearbox sub-assembly 22. The actuator sub-assembly 24 is configured and operates to selectively introduce the work and power from the gearbox sub-assembly to an output apparatus, such as a glass 4, vent, wind deflector, or shade of the sunroof system 10, to unlatch or latch the vent, wind deflector, or shade, or move the vent, wind deflector, shade, or glass 4 toward an open or closed position.

The gearbox sub-assembly 22 includes a gearbox mold or case 26 and a gearbox lid 28 adjacent multiple driving gearbox components 30. The illustrated components are provided by way of example and the gearbox is not limited to the number, types, size, etc., of gears shown. As provided elsewhere herein, the gearbox 22 is not limited to including gears and may include other components for transferring or translating work and power, along with or instead of gears, such as belt or chain drives, linkages, hydraulic or pneumatic couplings, clutches, etc. For naming purposes, while gearbox and related terms are used generally herein, it will be appreciated that corresponding terms could be used depending on the makeup of the transferring or translating components (e.g., pneumatic box, etc.). Further, the term box is used generically in places herein to refer to a unit, device, sub-device, combinations of the same, and the like, and the term is thus not necessarily limited in terms of size, shape, number, etc.

The exemplary gearing 30 shown in FIG. 5 includes a screw or worm 32 in constant contact with a worm gear 36. Rotation of the worm 32 causes corresponding rotation of the worm gear 36. The worm 32 is connected to a source component 34, which is in turn connected to the motor 18 (FIG. 3). Portions of the source component 34 (e.g., portions closer to and those more distant from its source at the motor) are connected to the motor 18 either directly (e.g., with no intervening parts, such as the case for the third assembly $12^3$ in FIG. 3) or indirectly (e.g., by way of other assemblies, such as for the first and second assemblies $12^1$, $12^2$ in FIG. 3).

When the motor 18 operates, its motion causes, by the connection, motion (e.g., turning) of the source component 34, which in turn causes motion (e.g., turning) of the worm 32 or other translation component. The translation of work of the source component 34 to work of a translation component such as the worm gear 36 occurs in all of the assemblies $12^1$, $12^2$, $12^3$ simultaneously.

The actuator sub-assembly 24 operates to selectively engage the work of the translation component 36 (e.g., worm gear), as described further below.

The gearing 30 also includes an output component 38, such as an output gear or shaft connected rigidly to the clutch component 54. When the actuator sub-assembly 24 is in the actuated position, the clutch component 54 is caused to link to the worm gear 36. When the two are linked, the input work and power, in the form of motion, of the worm gear 36 translates to corresponding motion of the clutch component 54 and so the output shaft 38. This operation is described in still further detail below.

With continued reference to FIG. 5, the actuator sub-assembly 24 includes an actuator base 40 and an actuator lid 42 adjacent multiple other of the actuator sub-assembly components 44. Two or more of any parts shown separately can be combined into a single piece. For instance, a gearbox sub-assembly lid 42 and an actuator sub-assembly base 40 can be a single part. Similarly, parts shown as a single piece can include two or more separate pieces.

The other actuator sub-assembly components 44 include an actuating element 46, such as a lever. While a lever is shown by way of example, the actuating element 46 may have any of a wide variety of configurations, in the form of a lever or otherwise. The actuating element 46 may also have any of a wide variety of shapes and sizes without departing from the scope of the present technology.

The actuator sub-assembly 24 also includes a base or reference structure 48 that the actuating element moves respective to. In the illustrated embodiment, in which the actuating element 46 is in the form of a lever, the reference structure 48 includes a pivot for the lever 46.

The actuator sub-assembly 24 further includes an active material 50. The exemplary active material 40 shown in FIG. 5 is in the form of an extruded wire. The active material, though, may have any of a variety of shapes and sizes, and is not limited to a wire.

When the actuator sub-assembly is in an un-actuated position, each of the moving parts of the sub-assembly and the assembly as a whole can be said to be in their respective un-actuated positions, and the converse regarding actuation.

Active Material in More Detail

In some embodiments, the active material 50 is a phase-change material, such as a shape memory alloy (SMA). Other exemplary active materials include electroactive polymers (EAPs), piezoelectric materials, magnetostrictive materials, and electrostrictive materials.

Shape-memory alloy is the generic name given to alloys that exhibit the relatively unusual property of having a strain memory, which can be induced by an input, e.g., a mechanical or thermal input. This unusual property is characterized primarily by two thermo-mechanical responses known as the Shape-Memory Effect (SME) and Superleasticity.

Exemplary alloys include copper alloys (CuAlZn), nickel-titanium-based alloys, such as near-equiatomic NiTi, known as Nitinol, and ternary alloys such as NiTiCu and NiTiNb. A particular exemplary allow includes NiTi-based SMAs. NiTi-based SMAs one or the best, if not the best memory properties—i.e., readily returnable to a default shape, of all the known polycrystalline SMAs. The NiTi family of alloys can withstand large stresses and can recover strains near 8% for low cycle use or up to about 2.5% for high cycle use. The strain recovery capability can enable the design of SMA-actuation devices in apparatuses requiring the selective transfer of torque from a torque generating device to each of a plurality of output shafts.

In an Austenite, or parent phase of an SMA, the SMA is stable at temperatures above a characteristic temperature referred to as the Austenite finish ($A_f$) temperature. At temperatures below a Martensite finish ($M_f$) temperature, the SMA exists in a lower-modulus phase known as Martensite. The unusual thermo-mechanical response of SMAs is attributed to reversible, solid-state, thermo-elastic transformations between the Austenite and Martensite phases.

Additional Actuator Sub-Assembly Components

With continued reference to FIG. 5, the actuator sub-assembly 24 further includes a locker hat 52 adjacent the locker 54. The hat 52 is sized, shaped, and positioned, to cause the locker 54 to engage or link selectively to the worm gear 36.

As also referenced above, because the output component 38 of the gearbox sub-assembly 22 is rigidly connected to the locker 54 of the actuator sub-assembly 24, motion of the worm gear 36, caused by input motion of the worm 32, translates by way of the locker 54 to motion of the output component 38.

As shown in more detail in FIGS. 7 and 10, the locker 54 includes one or more linking components $56^1$ and return components $56^2$. In the illustrated embodiment, these are one or more locker pins $56^1$ and corresponding locker springs $56^2$. While pins and springs $56^1$, $56^2$ are shown by way of example, it will be appreciated that the locker can include other components operating to selectively engage/disengage the locker 54 to the worm gear 32 (or analogous component in its place) in response to locker 54 being actuated by the locker hat 52 (or analogous component in its place).

The linking, or pin components $56^1$ are sized, shaped, and positioned to engage corresponding features of the worm gear 36 (or analogous component in its place). In the illustrated embodiment, the worm gear includes one or more grooves 58 for engagement with the pins $56^1$ of the locker 54.

The actuator/gearbox 12 is configured so that the locker 54 can engage the worm gear 34 whether the worm gear 34 is turning in one direction or the other. This allows moving of the output component 38 in a first direction or a second direction when the locker 54 is engaged, depending on whether the motor 18 is controlling the input components (e.g., worm and worm gear 32, 36) to turn their first or second directions.

As also shown in FIG. 5, the actuator sub-assembly 24 includes a hot cutoff component 60. The hot cutoff component 60 includes a sensor $60^1$ (referenced expressly in FIG. 6) for determining when the lever passes rotates beyond a certain point. An exemplary hot cutoff sensor $60^1$ is a photo encoder or interrupter configured to determine when light passing between portions of the sensor is interrupted by the lever 46, indicating that the lever has moved sufficiently—e.g., as far as the lever 46 needs to go to do its work of pushing down the locker 54. When the hot cutoff 60 determines that the lever 46 has moved sufficiently (e.g., reached its second position), it sends a signal operable to reduce or shutoff the heat source (e.g., electrical or thermal) to the active material. The signal can be sent to, e.g., system hardware (e.g., at the circuit board 66) and/or software (e.g., software stored at the computer-readable storage medium), or other device affecting the heat source. This arrangement has benefits including saving energy by providing only enough as is needed to move the lever 46 to the second position and then providing only enough to maintain that position for the lever 46. The arrangement also, by providing a safety against overheating, allows a high initial input (e.g., electrical or thermal) to the active material 50, thereby causing a quick-response actuation. Thereafter, the input can be lowered appropriately to maintain the desired position. Without the shutoff, a high initial input would likely cause over-actuation. Still another benefit of the hot cutoff arrangement is avoiding overheating of the active material 50, limiting activity, and so wear, of the active material.

The hot cutoff logic function, like all control aspects disclosed herein, can be performed partially or fully at the actuator assembly 12, in hardware (e.g., at the circuit board 66) and/or software (e.g., software stored at the computer-readable storage medium), and partially or fully at a computing device (e.g., vehicle central processing unit) relatively remote to the actuator assembly.

Benefits of having some of the logic and/or decision making structure at or closer to the actuating assembly 12 (e.g., at the circuit board 66) include quicker response time. Benefits of having some of the logic and/or decision making structure separated from the actuating assembly 12 (e.g., at a central processing unit of the vehicle) include cost savings, from using existing resources and avoiding the addition of such resources to the assembly 12.

Another function associated with the actuator assembly 12, performed partially or fully at the actuator assembly and/or remote to the assembly, and partially or fully in hardware or software, is a constant current function. This function is configured to regulate an input voltage to keep it at about a desired voltage. As an example, the constant current function regulates effective voltage to be at a desired about 13V even as an actual input voltage varies between 9V and 16V, such as due to various or varying voltage source qualities and/or voltage requirements of the automobile in which the actuator assembly 12 is positioned.

Another beneficial optional function of the actuator assembly 12, is a temperature-compensation function. This function affects an amount of input (e.g., electricity or thermal) to the active material based on a temperature at or adjacent the actuator assembly 12. The function may receive the temperature from one or more of a variety of sources, including (i) a low-cost thermistor in the actuator (e.g., connected to the circuit board 66), (ii) a vehicle temperature gage, such as a gage positioned and configured to measure temperature of the vehicle adjacent a roof, and (iii) the active material 50, itself. For the latter, in one embodiment the actuator assembly 12 would include features for measuring aspects of the active material 50 indicative of ambient temperature adjacent the active material. The aspects of the active material 50 indicative could be, for example, resistivity, or a measure of elongation.

Benefits of the temperature-compensation function include maintaining a consistent user experience, including response time, irrespective of the temperature at or adjacent the active material 50, and in some cases saving power. Thus, for instance, if the ambient temperature is 20 degrees below average, the temperature-compensation function would determine that a correspondingly higher input (e.g., electric or thermal) should be provided to the active material 50, at least initially, to cause and maintain the desired response time, and limit lag. Similarly, if the ambient temperature is 20 degrees higher than average, the temperature-compensation function would determine that a correspondingly lower input (e.g., electric or thermal) can be provided to the active material 50 to cause and maintain the desired response time, and limit lag. In the latter scenario (higher-than-average temperature), power is conserved as less than is usually provided is actually provided, while the desired result is still provided consistently.

FIG. 6—Details of the Actuator Sub-Assembly

FIG. 6 shows a perspective view of components of the actuator sub-assembly 24 shown in the exploded view of FIG. 5, here assembled. For simplifying the view of FIG. 6, some components of the sub-assembly 24 are not shown, including the locker hat 52 and the locker 54—these components are reintroduced by the detailed views of other figures—e.g., FIGS. 7 and 10. The components shown in FIG. 6 common to those of FIG. 5 are identified by the same reference numerals.

As also shown in FIG. 6, the actuator sub-assembly 24 may include a biasing component 62 configured and positioned for returning the lever 46 toward a first, engaged, state or position.

In the illustrated example, the biasing component $62^1$ is a spring. Various types and sizes of springs may be used for biasing the lever 46 toward the first position. The spring $62^1$ connects to two anchoring points 64, a first of which $64^{1-1}$ is shown in FIGS. 6, 8 and 9. An example second anchoring point $64^{1-2}$ for the spring $62^1$ is shown in FIG. 5. When the lever 46 is moved out of its first position, the locker 54 disengages from the worm gear 36 (the hat, locker, and worm gear not shown in FIG. 9). FIGS. 8 and 9 are described further below.

With continued reference to FIG. 6, the figure also shows an anchoring point $50^1$ for a first end of the active material 50. The first end is static, such as with respect to the actuator base 40. A second anchoring point $50^2$ for the active material is shown in FIG. 6.

The active material 50, e.g., SMA element, extends from the static anchoring points $50^1$, $50^2$, to around a third, moving anchor $46^3$ on the lever 46. In one embodiment, the active material 50 wraps around the lever 46 at generally a midportion $50^2$ of the active material 50. Similarly, the second anchoring point $50^2$ can be located in the actuator assembly 12 at a position analogous to and opposite (e.g., a mirroring location of) a position of the first anchoring point $50^1$.

The lever groove $46^3$ is configured to receive and hold the portion $50^2$ of the active material 50 wrapping around the lever 46. As shown in more detail in FIG. 7, the third anchor $46^3$ can include a chevron-shaped groove in which the active material 50 rides.

The actuator sub-assembly 24 further includes, at or adjacent at least one of the first and second anchoring points $50^1$, $50^2$, an electrical or thermal source (not shown in detail). The electrical or thermal source may be for example, connected to a battery for selectively providing an input current to the active material 50, thereby causing the active material to heat and, in response, change phase. The active material 50 changing shapes thereby changes size there effecting work in the form of movement of the lever 46, by pulling the lever about the pivot 48.

FIG. 7—Details of the Actuator Sub-Assembly

FIG. 7 also shows a side elevation of components of the actuator sub-assembly 24 shown in FIG. 5. The actuator sub-assembly 24 in FIG. 7 includes an alternative arrangement for biasing the lever 46 toward the first position—i.e., with the working end $46^1$ of the lever moved to its downward position (the other end is referenced generally by $46^2$ in the figures). Particularly, the sub-assembly 24 of FIG. 7 includes an alternative positioning of a spring $62^2$ as the biasing component as compared to FIG. 6. In this arrangement, the spring $62^2$ is connected to a first, static, anchoring point $64^{2-1}$ and a second anchoring point $64^{2-2}$. The first anchoring point $64^{2-1}$ is static (e.g., with respect to the actuator base 40) and the second anchoring point $64^{2-2}$ is connected to the lever 46 so as to bias the lever toward the second position (shown in, e.g., FIG. 9).

As also shown in FIG. 7, and referenced above, the actuator sub-assembly in some embodiments also includes a chip or circuit board 66. The circuit board stores some or all of the logic used to control operation of the actuator assemblies 12, 72 described herein (the latter type of assembly 72 is described below in connection with FIG. 17). The logic and operation, which may be performed separate from, instead of, or in combination with operation of the processor 19, thereof is described further below.

FIG. 7 also shows example dimensions of the actuator sub-assembly 24. Although the actuator base 40 may have other lengths $67^1$ without departing from the scope of the present technology, in one embodiment the actuator base 40 has a length $67^1$ of between about 100 mm and about 115 mm. In a particular embodiment, the length $67^1$ is about 108.7 mm.

Although the actuator sub-assembly may have other heights $67^2$ as measured between a bottom of the actuator base 40 and a top of the second type of biasing spring $62^2$, without departing from the scope of the present technology, in one embodiment the height $67^2$ is between about 60 mm and about 70 mm. In a particular embodiment, the height $67^2$ is about 21 mm.

Although the spring $62^2$ may have other diameters $67^3$ without departing from the scope of the present technology, in one embodiment the diameter $67^3$ of the spring $62^2$ is between about 4 mm and about 5 mm. In a particular embodiment, the diameter $67^1$ is about 4.57 mm.

FIGS. 8 and 9—Additional Views of Actuator Sub-Assembly Operation

FIG. 8 shows a side view of the components of the actuator sub-assembly 24 in the first position—i.e., with the working end $46^1$ of the lever moved to its downward position. More particularly, FIG. 8 shows the lever 46 in the first, engaged, position. In this embodiment, the actuator sub-assembly 24 is in its first, engaged, state or position when the active material 50 is not activated (i.e., not actuated).

When the active material 50 is not activated, there is no countering force keeping the biasing component 62 from pulling the lever 46 to the first position. In the first position, a working end $46^1$ of the lever 46 is downward, and thus pressing downward the locker hat 52, which in turn presses against the locker 54, which in turn engages the worm gear 36 (the hat, locker, and worm gear are not shown in FIG. 9), as described above and below in further detail.

References herein to directional indicators, such as down or up, are provided for descriptive purposes, in relation to the respective figures. The references are not meant to control an orientation that the system or components thereof have after installation (e.g., in an automobile) and during operation of the present technology. For instance, the actuator assembly may be arranged in a greater system (e.g., sunroof system or, more generally, an automobile) so that the working end $46^1$ of the lever 46 does not actually move vertically downward when it moves to the referenced downward position in connection with FIG. 8.

FIG. 9 shows a side view of the same components of the actuator sub-assembly 24 in the second position. In the second position, the working end $46^1$ of the lever is upward.

FIGS. 10 and 11—Actuator Sub-Assembly Motion with Hat and Locker

FIG. 10 shows a closer-up side view of the actuator sub-assembly 24, including the locker hat 52 and locker 54.

As described above, and shown in FIG. 10, the locker 54 includes locker pins $56^1$ and springs $56^1$. The arrows shown in FIGS. 10 and 11 represent the effective downward biasing force exerted by the spring 62.

In FIG. 10, the actuator sub-assembly is in the second position. Accordingly, the working end $46^1$ of the lever 46 is moved up, the locker hat 52 is in its up position, and the locker pins $56^1$ are not pushed down for engagement with the worm gear (the worm gear not being shown in FIGS. 10 and 11).

FIG. 11 shows a side view of the actuator sub-assembly 24 in the first position. Accordingly, the working end $46^1$ of the lever 46 is moved down, pushing down the locker hat 52, which in turn pushes the locker pins $56^1$ downward to their extended position. It is in this position that the locker pins $56^1$ engage the worm gear 36 (again, worm gear not shown in FIGS. 10 and 11).

Reversing Features

In some embodiments, additional active elements or other elements (e.g., single elements) with multiple positions may be used such that the motor has additional gears for reversing direction of the motor output, and so the direction of respective input gears (e.g., worm) at each actuator assembly. This will allow the user to move multiple features driven by a single, main, drive motor in either opposite or the same direction simultaneously at the same time.

Figure 12:
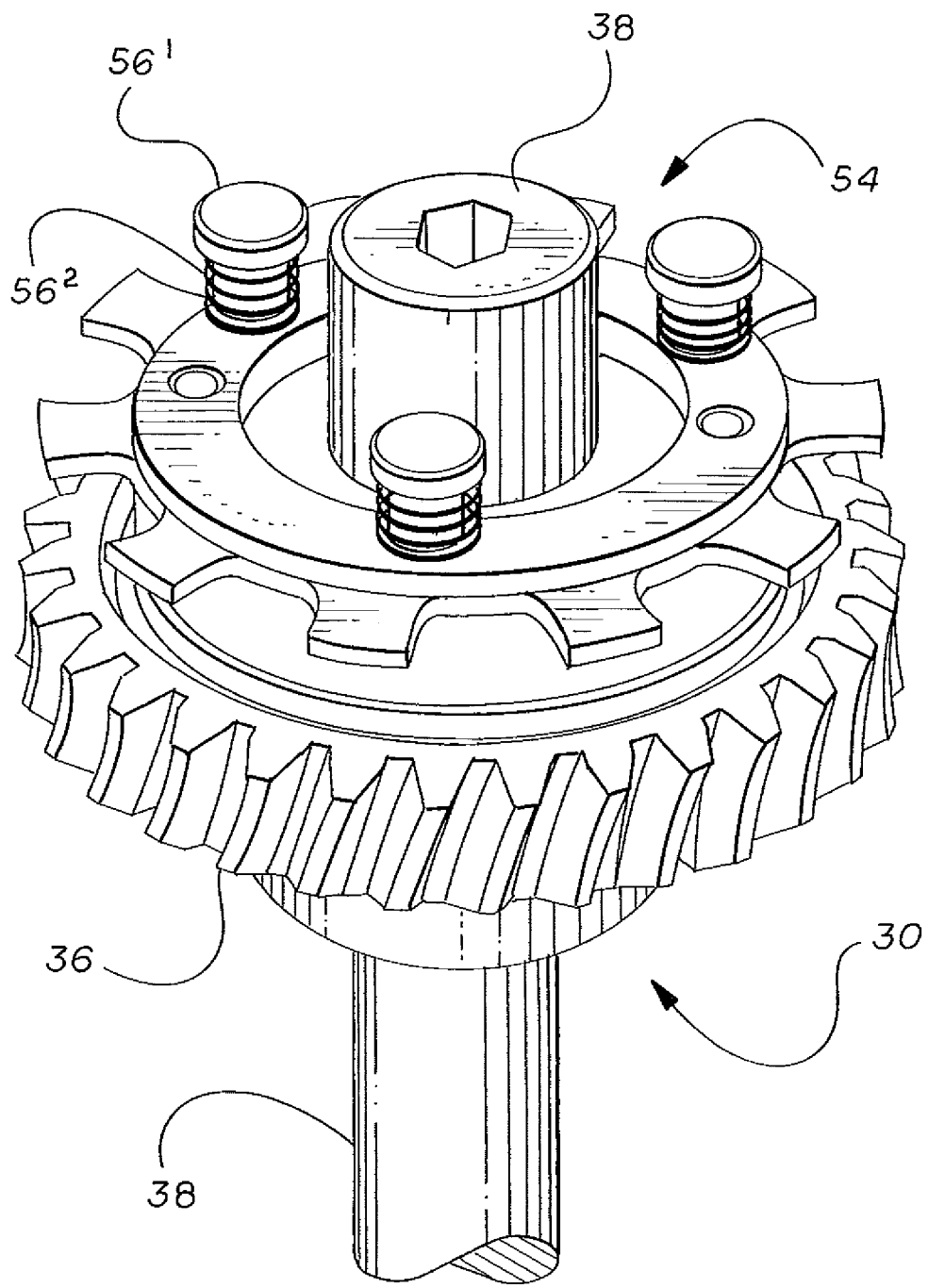
FIG. 12 is a perspective of an output shaft, an input gear, and a locker component of the actuator sub-assembly for selectively engaging the output shaft to the input gear.

FIG. 12—Locker—Worm Gear Detail

FIG. 12 shows a perspective view of the locker 54 and gearbox driving components 30 including the worm gear 36 and the output gear 38. The locker pins $56^1$ and the locker springs $56^2$ can be seen clearly at the top of the locker 54.

FIG. 13—Worm Gear—Output Gear Detail

FIG. 13 shows a perspective view of the gearbox driving components 30 including the worm 32, the worm gear 36, and the output gear 38.

FIG. 14—First Actuator/Gearbox Assembly Footprint

FIG. 14 shows a plan view of an actuator/gearbox assembly 12 like the first or second actuator/gearbox assemblies $12^1$, $12^2$ in FIG. 2, superimposed over the motor assembly 6 (from FIG. 1). FIG. 14 shows the significant reduction in size (and so corresponding space in the use environment—e.g., automobile) accompanying use of an actuator/gearbox 12 in place of a motor assembly 6.

Although the actuator/gearbox assembly 12 may have other dimensions, in one embodiment the assembly has a length of about 108.2 mm and a height of about 71.3 mm. For comparison, some traditional motors assemblies have a length of 149.6 mm and a height of 91.1 mm.

FIG. 15—Second Actuator/Gearbox Assembly Footprint

FIG. 15 shows a plan view of an actuator/gearbox/motor assembly $12^3/12$ like the third actuator/gearbox assembly $12^3$ in FIG. 2.

FIG. 15 also shows exemplary dimensions of the third actuator/gearbox assembly $12^3$ and motor 18, which may be connected thereto. Although these components can together have other heights $12^{2-1}$ (the dimension being referred to as a height with respect to the perspective of FIG. 15) without departing from the scope of the present technology, in one embodiment this height $12^{2-1}$ is between about 170 mm and about 180 mm. In a particular embodiment, the height $12^{2-1}$ is about 175 mm.

Although the assembly/motor $12^3/18$ combination can together have other total widths $12^{2-2}$ without departing from the scope of the present technology, in one embodiment this total width $12^{2-2}$ is between about 140 mm and about 145 mm. In a particular embodiment, the width $12^{2-2}$ is about 143.8 mm.

FIG. 16—Second Actuator/Gearbox Assembly Footprint

FIG. 16 shows a side view of the actuator/gearbox/motor assembly $12^3/18$ and gearing shown in FIG. 15.

Although the assembly/motor $12^3/18$ can have other thicknesses $12^{2-3}$ without departing from the scope of the present technology, in one embodiment the thickness $12^{2-3}$ is between about 87 mm and about 92 mm. In a particular embodiment, the thickness $12^{2-3}$ is about 89.9 mm.

FIGS. 15 and 16 show the first gear box $12^3$, adjacent the motor, from the top (FIG. 15) and the side (FIG. 16). The devices shown may include other helpful components. For example, for one prototype made, additional gears were added to the first gearbox $12^3$ in order allow reversing of the drive direction of the motor 18, requiring it to be different than the other two gearboxes $12^1$, $12^2$.

Although the assembly/motor $12^3/18$ combination can together have other thicknesses $12^{2-4}$, as shown in FIG. 16, without departing from the scope of the present technology, in one embodiment the thickness $12^{2-4}$ is between about 50 mm and about 57 mm. In a particular embodiment, the thickness $12^{2-4}$ is about 54.6 mm.

FIG. 17—First Alternative Actuator/Gearbox Assembly

FIG. 17 is a plan view of an actuator/gearbox assembly $72^1$, $72^2$ according to an alternative embodiment. An actuator/gearbox assembly like that of FIG. 17 is positioned in the system 10 shown in FIG. 2 in place of each of the first and second actuator/gearbox assemblies $12^1$, $12^2$ of FIG. 2.

The different size and shape of the assembly of this embodiment is configured to more conducive for a certain application than the size and shape of the embodiment of the assembly $12^1$, $12^1$ in FIG. 2. The different shape and size is possible because of changes in the configuration (e.g., size and shapes) of the internal parts inside, similar otherwise to the internal parts of the embodiment of FIGS. 3-13. The differing internal configuration is shown in more detail in FIGS. 19-24.

The differing configuration, and resulting external shape, of the embodiment of FIGS. 17 and 19-24 is exemplary of the flexibility with which the present technology can be implemented. It will be appreciated that the general concepts disclosed herein can be implemented in configurations (e.g., shapes and sizes) to fit needs or desires of a particular application.

FIG. 18—Second Alternative Actuator/Gearbox Assembly

FIG. 18 is a plan view of an actuator/gearbox assembly $72^1$ according to an alternative embodiment. The actuator/gearbox assembly $72^3$ is positioned in the system 10 shown in FIG. 2 in place of the third actuator/gearbox assembly $12^3$ of FIG. 2.

The different size and shape of the assembly of this embodiment is configured to more conducive for a certain application than the size and shape of the embodiment of the assembly $12^3$ in FIGS. 2 and 15. The different shape and size is possible because of changes in the configuration (e.g., size and shapes) of the internal parts inside, similar otherwise to the internal parts of the embodiment of FIGS. 3-13. The differing internal configuration is shown in more detail in FIGS. 20-24.

The differing configuration, and resulting external shape, of the embodiment of FIGS. 18 and 20-24 is another example of the flexibility with which the present technology can be implemented. Again, the general concepts disclosed herein can be implemented in configurations (e.g., shapes and sizes) to fit needs or desires of the designer.

FIG. 19—Interior of First Alternative Actuator/Gearbox

FIG. 19 is a plan view of the actuator/gearbox assembly $72^1$, $72^2$ of FIG. 17 with the actuator lid removed. Components of the assembly $72^1$, $72^2$ include a lever 74, which pivots about a lever pivot 76. The pivot is connected to an actuator base 77. The assembly $72^1$, $72^2$ also includes a contact component 78 connected to the lever 74 for translating movement of a working end of the lever to a locker hat 84.

As further shown in FIG. 19, the assembly $72^1$, $72^2$ also includes an active material 80. In this embodiment, and in the embodiments of the previous figures, the assembly may include more than one active material element. In FIG. 19, two active material elements $80^1$, $80^2$ are shown. As in earlier embodiments, the active material elements $80^1$, $80^2$ are in the form of a wire. The active material $80^1$, $80^2$ are connected to the actuator base 77 at respective first connection points $82^{1-1}$, $82^{2-1}$. At a second end of the active materials $80^1$, $80^2$, the materials are connected to the lever 76, at respective second connection points $82^{1-2}$, $82^{2-2}$.

The assembly $72^1$, $72^2$ also includes a locker hat 84. The locker hat 84 of this embodiment may be substantially the same as the locker hat 52 shown in embodiments shown in earlier figures. The assembly also includes an output gear 86 (shown in FIG. 20) and a locker 88, both of which can also be substantially the same as their versions in earlier embodiments (e.g., the output gear and the locker 38, 54 as shown in, and described in connection with, FIGS. 5, 7, 10, 11, and 12).

In operation, as described further below, the assemblies $72^1$, $72^2$, $72^3$ are arranged so that contraction of the active material 80 causes engagement between the output gear 86 and the worm gear (not shown in detail). This is opposite of the assemblies $12^1$, $12^2$, $12^3$, which are arranged so that contraction of the active material 50 results in disengagement of the output gear 38 and worm gear 46. Some aspects of the operation of the components of the assembly $72^1$, $72^2$ of this alternative embodiment are more easily seen in the perspective view of FIG. 20, which shows similar actuator components.

Line 1 indicates a drive axis of the motor. As described, the motor causes turning of an input part (e.g., worm), which in causes turning of the worm gear or wheel 88. In some embodiments, the worm gear 88 is integral with an output component (item 86 in FIG. 20), such as an output gear, output shaft, or output sprocket (e.g., a metal sprocket), which in turn meshes with and drives cables that operate the sun roof. The normally-engaged, but SMA-disengagable, clutch (e.g., locker) is positioned between the worm gear/wheel 88 and the output component (item 86 in FIG. 20).

FIG. 20—Interior of Second Alternative Actuator/Gearbox

FIG. 20 is a perspective view of the actuator/gearbox assembly $72^3$ of FIG. 18 with the actuator lid removed. The assembly $72^3$ of FIG. 20 has many components in common with the assembly $72^1$, $72^2$ of FIG. 19. While the components of the assembly $72^3$ need not be the same as those of the assembly $72^1$, $72^2$ of FIG. 19, components in FIG. 20 corresponding to components in FIG. 19 are labeled with the same reference numerals.

For example, the figures shows a lever 74, which pivots about a lever pivot 76, which is in turn connected to an actuator base 77. The assembly $72^3$ also includes a contact component 78 and active materials $80^1$, $80^2$. The assembly $72^3$ also includes a locker hat 84 and output gear 86.

In some embodiments, the components of the actuator/gearbox assembly $72^3$ of FIGS. 18 and 20 operate in substantially the same manner as the components of the assembly $72^1$, $72^2$ of FIGS. 17 and 19. As provided above, in operation, the assembly $72^3$ is arranged so that contraction of the active material 80 causes engagement between the output gear 86 and the worm gear (not shown in detail). This is opposite of the assemblies $12^1$, $12^2$, $12^3$ of the earlier embodiments.

In some embodiments, a strain relief that protects the SMA element from mechanical overload conditions is added. The strain relief/mechanical overload protection is useful for normally-disengaged—as opposed to a normally engaged—clutch design/embodiments. In these ways, the system can control strain and stress experienced by the SMA in operation. This can be done mechanically, with control electronics, or a combination of the two. Basically, in conditions in which the gears are not aligned or the system is loaded in such a way that the active element would be unable to move into position, the electronic and/or mechanical relief mechanism would prevent the active material from being damaged.

FIGS. 21 and 22—Detail of Alternative Actuator/Gearbox Assembly

FIG. 21 shows a close-up perspective view of components of the actuator/gearbox assembly $72^1$, $72^2$, $72^3$ of FIGS. 17-20. Particularly, FIG. 21 shows the lever 74, and so the locker hat 84 and the locker 88, in a down, engaged position. The figure also shows the output gear 86. FIG. 22 shows the lever 74, the locker hat 84, and the locker 88 in an up, disengaged position.

The working end of the lever 74, shown in FIG. 21, is connected to the locker hat 84 or directly to the locker 74 so that the locker moves up and down with the working end of the lever 74.

FIGS. 23 and 24—Side View of Alternative Actuator/Gearbox Assembly

FIG. 23 shows a side view of components of the actuator/gearbox assembly $72^1$, $72^2$, $72^3$ of FIGS. 17-20. Particularly, FIG. 23 shows the assembly in a down, engaged position, corresponding to the position shown in FIG. 21. FIG. 24 shows the assembly in an up, disengaged position, corresponding to the position shown in FIG. 22.

Additional Concepts

First Additional Concept

In a particular embodiment, a sensor (e.g., electrical, mechanical or both) is added to each gearbox to separate load signals from motion-feedback signals going to the master control unit. If the feedback signals associated with each output can be kept separate then better pinch protection control can be achieved when driving multiple features. Specifically, different pinch protection threshold levels can be specified for the different features and the computational cost associated with pinch protection, and the microprocessor resources needed for this system, reduced.

A sensor (e.g., a rotary encoder) can be added to each of the output shafts of the active-material-actuated transmission that drive the various output features. Alternatively, a position sensor (e.g., a linear position sensor) may be attached directly to the moving element of the features (e.g., sunroof glass, vent, etc.), instead of having a single encoder attached to the motor, which allows tracking of positions of all features, e.g., via a book-keeping function related to sensor multiplexing. For this, a dedicated encoder can be used for feeding back position-indicating data (e.g., position-indicating signals) of each output feature. Control aspects of the present technology can be simplified in this way.

Second Additional Concept

A second concept is useful in situations in which torque transmitted through the clutch would otherwise be higher than desired for individual active-material elements to provide the engagement for the clutch, and/or for the relevant spring mechanism to force disengagement for the clutch. The concept uses the motor itself to not only provide the torque that drives the output load but to also provide the force/torque for engaging the clutch. The active-material actuator element would provide only a small force/torque that would divert the necessary force/torque from the motor to perform the disengagement/engagement.

When an output feature, such as a sunroof glass or shade, is disengaged or engaged (depending on whether the system is configured to be default engaged or default disengaged), the motor provides a force/torque not only to drive the output but also to sustain disengagement/engagement. For embodiments in which the motor shaft rotates continuously to drive the output, but only through a finite angle to perform the disengagement/engagement, a type of slipping clutch (e.g., a friction clutch) can be used to allow a finite torque/force to be channeled from the motor to perform the disengagement/engagement corresponding to a finite rotation of the motor shaft while still allowing the motor shaft to rotate continuously to drive the output.

Because the motor can provide much higher force/torque than a compact active-material (e.g., SMA) element, this concept allows the technology to be applied even when the disengagement/engagement load can vary over a wide range, making the system more robust in this way.

If the disengagement/engagement is effected by the motor being tapped, as described, the resulting design can in some cases be smaller, more compact, at least because less actuator component are needed. For instance, in some cases, the lever 46 is removed.

Target applications for this concept include those requiring transmission of a large torque through the clutch, such as is usually the case in connection with output applications requiring a large amount of work and/or power (e.g., including a seat while the occupant is in it).

Third Additional Concept

FIG. 25 shows a schematic view of an aspect of an actuator mechanism 100 of the present technology according to an alternative embodiment. The mechanism includes an active-material, e.g., SMA wire, 102 (or cord, elongated film, etc.) extending between first and second fixed ends 104, 106. This arrangement can be referred to as a bowstring arrangement, with the wire acting as the bowstring. When the wire contracts, it exerts a downward force 108.

The downward force 108 performs the work performed by the working end of the levers shown in other embodiments described above—i.e., push down a hat 52 (not shown in FIG. 25), which in turn pushes down a locker, or otherwise actuates a clutch, such as a locker-type clutch. The mechanism 100 or greater system could include a biasing feature, such as a spring as described above (not shown expressly in FIG. 25), to, for example, control the wire position/return force, such as by biasing the wire 102 to its upward position.

It is also contemplated that the mechanism can be arranged so the clutch is normally activated (e.g., down). Two exemplary arrangements are described. In a first, the mechanism is generally like that in FIG. 25, the wire 102 being normally in its contracted state, and by being moved to its extended state releases the clutch mechanism. In a second, the wire is inverted so that the clutch is allowed to be down when the wire 102 is extended, and actuating of the wire causes work used to lift the clutch up. In the latter case, a biasing force biases the clutch to its engaged, down, position.

Other Control Logic Aspects

Introduction to the Additional Aspects of the Control Logic

As described above, controls of the present technology can be embodied in software of the controller 19, or another computing device, such as a vehicle computing unit, and/or in hardware, such as of the circuit board 66. By processing user inputs at a switch panel, and monitoring inputs and controlling the outputs, the electronic controller achieves the desired functionality for the respective features.

In connection with the example implementation, for the present technology, of a sunroof system, the technology can demonstrate one or more operations of the following: opening and closing sunroof glass, latching and unlatching a sunroof shade, opening and closing the shad, latching and unlatching a wind deflector, opening and closing the deflect, and opening and closing the glass in a manner forming and closing a vent. These functions are performed using a single drive motor (e.g., motor 18). In some embodiments, the transmission logic is said to be active-low, wherein the transmission is normally engaged when the actuators are off.

In one embodiment, there are the following five basic modes of operation for an electronic control device, whether the acting control device (which, as provided may at times herein be referred to generally simply as the controller, electronic controller, computer or computerized controller, and the like) is the controller 19, the vehicle control unit (e.g., body control module), the circuit board 66, and/or other (e.g., integrated circuit(s)). In any event, control features can be activated by a user switch inputs—e.g., a driver or passenger pressing a glass open button or switch, a glass close switch, a vent switch, a shade open or close switch, etc. The control features can include the following: 1. Initialize mode—wherein, upon power up, sets all three features to the full close position; 2. supervised open mode—features move in open direction while switch pressed; 3. supervised close—features move in close direction while switch pressed; 4. express open mode—features move to full open based on momentary input; and 5. express close mode—features move to full close based on momentary input. These modes, or logic operations, are described in further detail below.

The controller includes the following inputs and outputs to the sunroof. The motor (e.g., DC motor) can include an directional control circuit output, such as an H-bridge direction control circuit output, along with a current sense analog input. Each of the transmission modules (e.g., modules $12^1$, $12^2$, $12^3$) can contain a transistor/relay-driven (e.g., FET-driven) power output to the active element actuator and an optical encoder input, although various types of motors and motor controllers and associated components can be implemented according to the present technology. An exemplary hot cutoff in the form of an optical-based cutoff switch is described above (the reference numeral $64^1$). An exemplary constant current circuit for, e.g., over-heat protection, is also described above.

Idle State of Control Logic

For this embodiment, the electronic controller remains in an idle state while waiting idly, or alternatively while polling, for a user command from a switch input signal.

In one embodiment, during this time, a park/drive indicator, associate with a vehicle gear position, can be monitored.

When the vehicle is in drive, system current and pinch protection limits are increased over nominal park values.

Upon receiving an input that any of the control switches has been pressed, the controller interprets whether the input is either the Initialize or supervised open/close or express open/close. The controller ignores any conflicting switch inputs. For example, if glass express open and shade express close switches are both depressed, the signal is ignored since the motor cannot run in two directions at once. Similarly, if both an express mode and a supervised mode are selected, a conflict exists and the command is ignored.

Interrupt Driven Position Encoding of Control Logic

The controller monitors the three feature's position by either incrementing or decrementing a position count value by polling the encoder's status every five milliseconds.

Upon interrupt, the controller first determines whether the motor is in the off, open, or close state. If the motor is in the off state, the encoders are ignored and the stall-counters are cleared.

When the motor is in the open state, the controller determines which actuators are disengaged and the transmission hence engaged. The engaged encoders respective stall-counters are incremented and if their state has changed from the previous polling: 1. The position count is decremented; 2. The state flag is set to the opposite logic; and 3. The stall-count is cleared.

When the motor is in the close state, the controller determines which actuators are disengaged and the transmission hence engaged. The engaged encoders respective stall-counters are incremented and if their state has changed from the previous polling: 1. the position count is incremented; 2. the state flag is set to the opposite logic; and 3. the stall-count is cleared.

Motor Bump Aspect of Control Logic

Each time an individual transmission is disengaged, a Motor Bump routine takes place. The motor bump determines the current direction of the motor and runs it in opposite direction for a small (typically around 100 ms) and predetermined amount of time. This reversal of direction removes the load from the transmission and allows the actuator to return with little force necessary.

Pinch Protection Feature of Control Logic

The feature monitors an operating characteristic, e.g., electrical current, of the work source, e.g., motor, and maintained a running average of the characteristic. Pinch protection is in some embodiments enabled when the system or assembly is operating in either the supervised close mode or express close mode.

The operating characteristic, referenced in the preceding paragraph, is monitored, and the running average calculated, in continuous segment between two successive events or conditions, e.g., in distinct time windows or time segments. The average is reset (e.g., to zero or another pre-established base value) at a time between each window, such as upon ending of a time window or upon commencing a new time window. Each time window corresponds to an initiating condition, or trigger, and ends upon a stopping condition.

In one embodiment, the initiating condition is any of a turning on or off of the work source (e.g., motor). For embodiments in which the work source is reversible, such as for some motors, the initiating condition could also include the work source reversing its direction. The trigger could also include a change in operation of any one of the respective features (e.g., sunroof glass movement, sunroof shade movement, sunroof vent movement), such as the feature being turned on or off (e.g., sunroof glass open operation commenced or ended).

An offset value is preset and when the current value exceeds the running average plus the offset, a pinch is detected. In one embodiment, when this occurs, the motor stops immediately and reverses direction for a small amount of time to relieve the obstruction. The instructions can be configured to cause, in response to determining the pinch condition, the processor to initiate communicating of an alert or notification for notifying a user of the vehicle that the pinch protection error mode is present. The alert can be of any type—e.g., visual (e.g., light) and/or audible (e.g., beep).

In a traditional drive, which has one motor driving one power feature, the anti-pinch feature is typically implemented by setting an absolute limit on the current drawn by the motor. This limit acts as a threshold, which when crossed, triggers the anti-pinch functionality on that particular feature. This approach is generally viewed as inapplicable to the present technology in which a single motor is used for driving multiple features, possibly simultaneously.

For example, assume that hypothetical features 1, 2 and 3 have respective normal (e.g., allowable) current draws of $I^1$, $I^2$ and $I^3$ amperes, respectively, when they are being driven independently. Further, let $I^{1'}$, $I^{2'}$, and $I^{3'}$ be the corresponding anti-pinch thresholds and $I^1+I^2>I^{1'}$. Then, when features 1 and 2 are being driven simultaneously, the normal motor current draw exceeds the anti-pinch threshold for feature 1 being driven independently. Thus, the absolute motor current draw limits used to implement anti-pinch functionality in traditional sunroof drives cannot be used with our technology without the use of additional sensors beyond a current draw sensor for the single motor. Additional sensors (e.g., force or motion sensors on each mechanical moving element), for instance, can help in this situation and be a beneficial design choice.

The challenge of implementing the anti-pinch functionality in the framework of the present technology while still using only a motor current draw sensor can be addressed in the following manner. The controller monitors current drawn by the motor and computes a moving average of the last n samples. This can be referred to as a baseline $I_b(t)$ used for the anti-pinch functionality—the time dependence of the baseline is shown explicitly to emphasize that the baseline itself is changing with time as different features are added or dropped from the set of currently active outputs.

An anti-pinch threshold ($I_{ap}(t)$) is specified as some function of an absolute or fractional increase over the baseline $I_b(t)$. The $I_{ap}$ is, therefore, also a function of time. Basing the anti-pinch threshold on a time dependent baseline compensates for changes induced in the normal current draws for the various features due to various factors, such as changes in ambient temperatures, age and wear of the system components, etc. The approach is also scalable—little/no modification is needed as more features are driven by a single motor.

The pinch protection feature is described further as follows, including further reference to traditional practice.

As provided, traditional practice uses one motor per power driven output/feature (e.g., sunroof glass). Each motor also has a current draw sensor that monitors the current (i) drawn by the motor. In permanent magnet DC motors, which are commonly used for such applications, the torque (T) produced by the motor is linearly related to the current drawn by the motor. The torque produced by a motor is converted into a force (F) that overcomes resistance ($F_R$) offered by friction, external loads, etc to produce motion of the corresponding feature in the desired direction. The torque T is related to F, and hence to $F_R$, by the mechanical advantage (MA) of the interposed transmission as T=F/MA. Thus, we can relate the current drawn by the motor (i) to the force (F) exerted at the output to produce the desired motion at the output.

Pinch protection is a feature that limits the maximum force exerted during closure of a power-operated feature to a value ($F_{max}$) that mitigates injury to users in the event that an item is pinched between the moving elements of a power operated and the vehicle body. In addition to a maximum value of force, there is also a requirement that in the event of a pinch event, as characterized by the drive force F exceeding $F_{max}$, the drive output should be stopped and/or reversed.

For stopping the output, the drive source itself could be stopped, or the output otherwise blocked from being transferred to the input component of at least the actuator at which the pinch condition is present. The stoppage should be initiated within a specified time interval ($t_{max}$). The reverse condition should be initiated to cause reverse work output (e.g., the work source operating in reverse) for a pre-specified value, such as a pre-determined time, amount, or measure of distance—e.g., a time, amount, or movement, such as a specified distance ($d_r$) travel of components of the work source (e.g., rotations of a motor). The specified value, thus, corresponds to a certain movement of the feature (e.g., distance travel for a sunroof glass) at which the pinch condition occurred.

The power operated feature is designed such that the force F exerted by the moving elements to overcome the resistance $F_R$ to motion is always less than $F_{max}$. Typically, the force exerted by the moving elements of a feature i is limited to $F_{iL} < F_{max}$ during normal operation of the feature. The limiting force $F_{iL}$ varies with the feature and the operating conditions. As an example, when the vehicle is in motion interaction of the vehicle with the road and the surrounding air leads to a change in the resistance to motion experienced by the various articulating features. This results in an increase in $F_{iL}$ over its value when the vehicle is stationary. Another example is when a vehicle is parked on an incline. The change in the relative orientation of the vehicle with respect to the earth's gravitational field also leads to a change in $F_{iL}$.

In PMDC motors, the relationship between the current (i) drawn by the motor and the force (F) exerted at the moving element is used to convert the force constraint ($F_i < F_{iL}$) required by the pinch protection feature into a corresponding constraint ($i_i < i_{iL}$) on the current drawn by the motor. A sensor connected to each motor monitors the current drawn by that motor. If this constraint is violated, the controller stops the motor and reverses its motion to cause the moving elements of the feature to move through a distance $d_r$ in a direction that relieves the pinch condition. Since a motor drives only one feature in the current practice, there is a fixed value of the limiting motor current $i_{iL}$ for a given operating condition. This value may be hardwired into the control circuit or be specified as a constant in the control software.

Considering that a Feature 2 experiences a pinch condition when Feature 1 and 2 are on simultaneously, as the force required to drive Feature 2 rises above its nominal value, the torque required of the motor also increases beyond its nominal value and so does the current drawn by the motor.

Linearity of the current—torque relationship in a PMDC motor ensures that a given change in the motor torque $\delta T$ corresponds to the same change in the motor current $\delta i$ over its entire useful operating range. Therefore, when $F_2 > F_{2L}$, the current drawn by the motor also exceeds its limit: $i_{(1+2)} > i_{(1+2)L}$ and thereby, triggers the controller to stop the motor and reverse the drive. The same explanation holds if Feature 1 experiences the pinch event. The case when both features experience a pinch event simultaneously is straightforward.

The pinch protection control logic determines a limiting motor current value under any operating condition, over time, and for any combination of simultaneously active output features (e.g., glass and shade moving, or glass and vent moving, or other combination). The current limit according to one embodiment is computed at time $t_j$ as follows:

$$i_L(t_j) = \frac{\int_{t_j-\Delta t}^{t_j} i(t)\,dt}{\Delta t} + \delta i,$$

where the first term represents a moving average of the current draw recorded over the time interval $\Delta t$ immediately preceding the current time $t_j$.

As provided, the current limit is updated every time one of the following events occur, e.g., the motor is switched on/off, the motor reverses direction, any feature is turned on/off. The time included in the computation of the moving average is limited to a continuous segment between two successive events. Thus, the above expression for $i_L(t_j)$ cannot be computed for the first time interval $\Delta t$ following an event. A fixed value $i_{LF}$ is assigned to $i_L(t_j)$ during this period. A possible value for $i_{LF}$ in this example is $i_1 + i_2 + \delta i$. The interval $\Delta t$ is chosen in a manner that balances the need to minimize the time for which the pinch protection limit is maintained at a value higher than is desirable and the need to compute a reliable moving average in the presence of noisy measurements of the current. Also, $\Delta t < t_{max}$ i.e. the averaging time interval is chosen to be smaller than the maximum time permitted by the pinch protection requirements.

An alternative approach would involve updating the motor current limit based on the current state of the system, e.g.:

$$i_L(t_j) = \sum x_k(t_j)i_k + \delta i$$

$$x_k = \begin{cases} 1, & \text{if Feature } k \text{ is ON} \\ 0, & \text{otherwise,} \end{cases}$$

where the summation is carried out over all output features (k) driven by the motor, $i_k$ is the nominal operating current for Feature k and the indicator variable $x_k(t_j)$ is based on the sensed state (ON/OFF) of Feature k at time $t_j$. Note the fixed limiting motor current OA used in the previous approach may be computed in this manner.

The schemes described above are easily scalable to three or more features.

Initialize Modes of Control Logic

The initialize mode sets, in order, the vent, glass, wind deflector, and shade to their respective closed positions and defines the encoder count for the closed and open positions for the rest of the operating modes.

Initialize Mode for Vent

For this mode, all actuators (e.g., three actuators $12^1$, $12^2$, $12^3$ of FIG. 3) are turned on and the motor bump is performed in both directions to ensure that all transmissions are disengaged. And the vent actuator is turned off, causing it to be connected to the motor. The motor is driven in the open direction until either: a preset vent close stall current limit is reached, a stall count reaches a preset limit, or a timeout error is reached, and system is shutdown in alarm mode.

The motor is turned off for a small time period (e.g., 5 milliseconds), then driven in the close direction for a predetermined number of encoder back-steps to set the travel limit back from the hard stop. A vent position counter is set to the opened position and the closed position is calculated. The motor is driven in the close direction until the vent position counter is equal to the closed value while polling the following error modes: current limit exceeded, stall-count exceeded, timeout reached.

Ending the mode, the motor is turned off and the actuators (e.g., three actuators) are turned off.

Initialize Mode for Glass

For this mode, all of the actuators (e.g., three actuators) are turned on and the motor bump is performed. The glass actuator is turned off, causing it to be connected to the motor. And the motor is driven in the close direction until either: a preset glass close stall current limit is reached, a stall-count reaches a preset limit, or a timeout error is reached, and system is shutdown in alarm mode.

The motor is turned off for a small time period (e.g., 5 milliseconds), then driven in the open direction for a predetermined number of encoder back-steps to set the travel limit back from the hard stop. The glass position counter is set to the closed position and the opened position is calculated.

Ending the mode, the motor is turned off and all of the actuators are turned off.

Initialize Mode for Shade

For this mode, all of the actuators (e.g., three actuators) are turned on and the motor bump is performed. The Shade actuator is turned off, causing it to be connected to the motor. The motor is driven in the close direction until either: a preset shade close stall current limit is reached, a stall-count reaches a preset limit, or a timeout error is reached, and system is shutdown in alarm mode.

The motor is turned off for a small time period (e.g., 5 milliseconds), then driven in the open direction for a predetermined number of encoder back-steps to set the travel limit back from the hard stop. A shade position counter is set to the closed position and the opened position is calculated.

Ending the mode, the motor is turned off and all of the actuators are turned off.

Supervised Open Function of Control Logic

The supervise open mode moves the features selected from the user input switches while either the switches remained depressed, or the encoder position has reached the fully opened condition, or an error occurs.

For this mode, the controller exits from the idle state upon sensing either the glass, shade, or vent supervised open switches have been depressed. The process includes a small de-bounce time delay, which is in one embodiment, about 50 microsecond.

The actuators are turned on to disengage the features not selected by the user, and the motor is driven in the open direction while status of the switches, current, stall-count, timer, and position are continuously polled. If either the current, stall-count, or timer limits are exceeded, the motor is turned off and the user is alerted which error mode occurred.

When any of the selected features either reaches their end of travel, or their switch is released, then the motor is turned off, the actuator for the feature is turned on, and a motor bump is performed.

The motor continues in the open direction until either all switches are released or all features have reached the end of travel.

Ending the mode, the motor is turned off, all actuators are turned on and the motor bump performed, and then all of the actuators are turned off and a ready indicator is lit indicating that the system is ready for a next command.

Supervised Close Function of Control Logic

The supervised close mode moves the features selected from the user input switches while either the switches remained depressed, or the encoder position has reached the fully closed condition, or an error occurs. Pinch protection is also engaged and interrupts the travel.

For this mode, the controller exits from the Idle state upon sensing either the glass, shade, or vent supervised close switches have been depressed. The small de-bounce time delay is allowed and then the actuators are turned on to disengage the features not selected by the user.

The motor is driven in the close direction while status of the switches, current, stall-count, timer, and position are continuously polled. If either the current, stall-count, or timer limits are exceeded, the motor is turned off and the user is alerted which error mode occurred.

As provided above, pinch protection can be monitored during this mode. When any of the selected features either reaches their end of travel, or their switch is released: the motor is turned off, the actuator for the feature is turned on, and a motor bump is performed. The motor continues in the close direction until either all switches are released or all features have reached the end of travel.

Ending the mode, the motor is turned off, all actuators are turned on, a motor bump is performed, and then all of the actuators are turned off and a ready indicator is lit indicating that the system is ready for a next command.

Express Open Function of Control Logic

The express open mode moves the features selected from the momentary user input switches until the encoder position has reached the fully opened condition, the user hits interrupts by depressing a switch, or an error occurs.

For this mode, the controller exits from the idle state upon sensing either the glass, shade, or vent supervised open switches have been depressed. A small de-bounce time delay is allowed, and then the actuators are turned on to disengage the features not selected by the user.

The motor is driven in the open direction while status of the switches, current, stall-count, timer, and position are continuously polled. If either the current, stall-count, or timer limits are exceeded, the motor is turned off and the user is alerted which error mode occurred. If an input switch is depressed, the routine is exited. When any of the selected features either reaches their end of travel, the motor is turned off, the actuator corresponding to the feature is turned on, and a motor bump is performed. The motor continues in the open direction until all features have reached the end of travel.

Ending the mode, the motor is turned off, all of the actuators are turned on, and a motor bump is performed. Then all of the actuators are turned off and a ready indicator is lit indicating that the system is ready for a next command.

Express Close Function of Control Logic

The express close mode moves the features selected from the momentary user input switches until the encoder position has reached the fully closed condition, the user hits interrupts by depressing a switch, or an error occurs. Pinch protection, if engaged, can interrupt the travel.

For this mode, the controller exits from the Idle state upon sensing either the glass, shade, or vent supervised close switches have been depressed, and a small de-bounce time delay is allowed. Then, the actuators are turned on to disengage the features not selected by the user, and the motor is driven in the close direction while status of the switches, current, stall-count, timer, and position are continuously polled.

If any of the current, the stall-count, or a timer limit is exceeded, the motor is turned off and the user is alerted which error mode occurred. If an input switch is depressed, the routine is exited. As provided above, pinch protection can be monitored during this mode.

When any of the selected features reaches their end of travel, the motor is turned off, the actuator corresponding to the feature is turned on, and a motor bump is performed. The motor continues in the close direction until all features have reached the end of travel.

To end the mode, the motor is turned off, all actuators are turned on and a motor bump is performed. Then, all actuators are turned off and a ready indicator is lit indicating that the system is ready for a next command.

CONCLUSION

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed:

1. An actuator system, comprising:
an input sub-system having an input component configured to connect to an input element which is in turn connected, during operation of the actuator system, to a work source;
an output sub-system being connectable selectively to the input sub-system by way of an actuator sub-system for receiving work from the work source via the input sub-system; and
the actuator sub-system comprising an active material and an actuating component, wherein:
the active material, when activated, changes in one or both of size and shape thereby causing the actuating component to move from a first state to a second state; and
the actuator sub-system is configured so that:
the output sub-system is disengaged from the input sub-system when the actuating component is in the second state; and
the output sub-system is engaged to the input sub-system for receiving work from the work source via the input sub-system when the actuating component is in the first state.

2. The actuator system of claim 1, wherein the actuator system is configured to, in operation, affect movement of a part of a vehicle sunroof assembly using the work received at the output sub-system from the work source, via the input sub-system, when the actuating component is in the second state.

3. The actuator system of claim 1, further comprising:
a first device comprising the input sub-system, being a first input sub-system, the input component being a first input component, the output sub-system being a first output sub-system, the actuator sub-system being a first actuator sub-system, the active material being a first active material, and the actuating component being a first actuating component; and
a second device comprising:
a second input sub-system having a second input component configured to connect to the input element;
a second output sub-system being connectable to the second input sub-system for receiving work from the work source via the second input sub-system; and
a second actuator sub-system having a second active material and a second actuating component, wherein the second actuator sub-system is configured so that:
the second active material, when activated, changes in one of size and shape thereby causing the second actuating component to move between a third state and a fourth state;
the second output sub-system is disengaged from the second input sub-system when the second actuating component is in the third state; and
the second output sub-system is engaged to the second input sub-system for receiving work from the work source via the second input sub-system when the second actuating component is in the fourth state.

4. The actuator system of claim 3, wherein the second actuator sub-system is configured so that the second active material, when activated, causes the second actuating component to move from the third state to the fourth state.

5. The actuator system of claim 1, wherein the actuator sub-system includes a bias component for biasing the actuating component toward the first state and away from the second state.

6. The actuator system of claim 1, wherein the active material is selected from a group of materials consisting of:
a shape memory alloy;
an electroactive polymer;
a magnetostrictive material; and
an electrostrictive material.

7. The actuator system of claim 1, wherein the active material is shaped as a wire.

8. The actuator system of claim 1, wherein the active material is configured to change in one or both of size and shape in response to a thermal input.

9. The actuator system of claim 1, wherein the active material is configured to change in one or both of size and shape in response to a change in an amount of electrical field or electrical current to which the active material is exposed.

10. The actuator system of claim 1, wherein the active material is configured to change in one or both of size and shape in response to a change in an amount of magnetic field to which the active material is exposed.

11. An actuator system, comprising:
a first actuator device having a first input sub-system configured to connect to a work source, a first output sub-system, and a first actuating sub-system having a first default engaged position and a first active material that, when activated, changes in one or both of size and shape thereby causing disengagement of the first input sub-system from the first output sub-system; and
a second actuator device having a second input sub-system configured to connect to the work source, a second output sub-system, and a second actuating sub-system having a second default engaged position and a second active material that, when activated, changes in one or both of size and shape thereby causing disengagement of the second input sub-system from the second output sub-system.

12. The actuator system of claim 11, further comprising a third actuator device having a third input sub-system configured to connect to the work source, a third output sub-system, and a third actuating sub-system configured to selectively engage the third input sub-system to the third output sub-system.

13. The actuator system of claim 11, wherein the first active material is selected from a group of materials consisting of:
   a shape memory alloy;
   an electroactive polymer;
   a magnetostrictive material; and
   an electrostrictive material.

14. The actuator system of claim 11, wherein the first active material is configured to change in one or both of size and shape in response to an input selected from a group of inputs consisting of:
   a thermal input;
   a mechanical input;
   a change in an amount of electrical field or electrical current to which the active material is exposed; and
   a change in an amount of magnetic field to which the active material is exposed.

15. The actuator system of claim 14, wherein the second active material is configured to change in one or both of size and shape in response to an input selected from the group of inputs consisting of:
   a thermal input;
   a mechanical input;
   a change in an amount of electrical field or electrical current to which the active material is exposed; and
   a change in an amount of magnetic field to which the active material is exposed.

16. The actuator system of claim 11, wherein one or both of the first active material and the second active material is shaped as a wire.

17. An actuator system, comprising:
   an input sub-system comprising an input component configured to be connected to an input element which is in turn connected, during operation of the actuator system, to a work source;
   an output sub-system being connectable selectively to the input sub-system by way of an actuator sub-system for receiving work from the work source via the input sub-system; and
   the actuator sub-system comprising an active material and an actuating component, wherein:
      the active material, when activated, changes in one or both of size and shape thereby causing the actuating component to move from a first state to a second state; and
      the actuator sub-system is configured so that:
         the output sub-system is disengaged from the input sub-system when the actuating component is in the first state; and
         the output sub-system is engaged to the input sub-system for receiving work from the work source via the input sub-system when the actuating component is in the second state.

18. The actuator system of claim 17, wherein the active material is selected from a group of materials consisting of:
   a shape memory alloy;
   an electroactive polymer;
   a magnetostrictive material; and
   an electrostrictive material.

19. The actuator system of claim 17, wherein the active material is configured to change in one or both of size and shape in response to an input selected from a group of inputs consisting of:
   a thermal input;
   a mechanical input;
   a change in an amount of electrical field or electrical current to which the active material is exposed; and
   a change in an amount of magnetic field to which the active material is exposed.

20. The actuator system of claim 17, wherein the active material is shaped as a wire.

* * * * *